(12) United States Patent
Fiske et al.

(10) Patent No.: US 7,565,548 B2
(45) Date of Patent: Jul. 21, 2009

(54) BIOMETRIC PRINT QUALITY ASSURANCE

(75) Inventors: Michael S. Fiske, San Francisco, CA (US); Jon Louis, Mountain View, CA (US)

(73) Assignee: Biogy, Inc., San Francisco, CA (US)

( * ) Notice: Subject to any disclaimer, the term of this patent is extended or adjusted under 35 U.S.C. 154(b) by 0 days.

(21) Appl. No.: 11/281,120

(22) Filed: Nov. 17, 2005

(65) Prior Publication Data

US 2006/0117188 A1 Jun. 1, 2006

Related U.S. Application Data

(63) Continuation-in-part of application No. 11/131,652, filed on May 17, 2005.

(60) Provisional application No. 60/646,463, filed on Jan. 24, 2005, provisional application No. 60/637,536, filed on Dec. 20, 2004, provisional application No. 60/631,199, filed on Nov. 26, 2004, provisional application No. 60/629,868, filed on Nov. 18, 2004.

(51) Int. Cl.
*H04L 9/00* (2006.01)
*G06K 9/68* (2006.01)
*G06K 9/20* (2006.01)
*G06K 9/60* (2006.01)

(52) U.S. Cl. .................. 713/186; 382/125; 382/126; 382/162; 382/181

(58) Field of Classification Search ............... 713/186; 382/125, 126, 115
See application file for complete search history.

(56) References Cited

U.S. PATENT DOCUMENTS 7,415,614 B2 8/1908 Guillou
3,671,777 A 6/1972 Newell (Continued)

FOREIGN PATENT DOCUMENTS

EP 1434162 A2 * 6/2004

(Continued)

OTHER PUBLICATIONS

Suto et al., Compact Fingerprint Verification Device: FingerToken, NTT Technical Review, Feb. 2004.*

(Continued)

*Primary Examiner*—Nasser G Moazzami
*Assistant Examiner*—Eleni A Shiferaw
(74) *Attorney, Agent, or Firm*—David Lewis

(57) ABSTRACT

Quality of biometric prints is enhanced by any one of several different methods. In one embodiment, if a biometric print does not have a high enough quality, the biometric print is discarded. In another embodiment, a matching score is associated with the degree to which the two biometric prints match. In another embodiment, a ranking is associated with a biometric print, and the ranking is determined based upon two or more matching scores associated with the biometric print. In another embodiment, a variety of distinguishing features are derived from a given biometric print and are stored for authenticating a biometric print of a user requesting access to a secure entity. In an embodiment, a transformation is applied to at least a portion of a newly acquired biometric print to improve the match of the newly acquired biometric print to a stored biometric print.

51 Claims, 12 Drawing Sheets

U.S. PATENT DOCUMENTS

| | | | |
|---|---|---|---|
| 3,742,739 | A | 7/1973 | Hickman |
| 4,587,516 | A | 5/1986 | Hiraki |
| 4,799,719 | A | 1/1989 | Wood |
| 5,061,923 | A | 10/1991 | Miller et al. |
| 5,402,492 | A | 3/1995 | Goodman et al. |
| 5,437,174 | A | 8/1995 | Aydin |
| 5,473,922 | A | 12/1995 | Bair et al. |
| 5,517,184 | A | 5/1996 | Dawson et al. |
| 5,612,683 | A | 3/1997 | Trempala et al. |
| 5,616,683 | A | 4/1997 | Neuert et al. |
| 5,653,135 | A | 8/1997 | Miller et al. |
| 5,659,626 | A * | 8/1997 | Ort et al. .................... 382/125 |
| 5,799,098 | A * | 8/1998 | Ort et al. .................... 382/125 |
| 5,825,880 | A | 10/1998 | Sudia et al. |
| 5,887,140 | A * | 3/1999 | Itsumi et al. ................ 709/225 |
| 5,896,026 | A | 4/1999 | Higgins |
| 5,903,225 | A * | 5/1999 | Schmitt et al. .............. 713/186 |
| 5,926,555 | A * | 7/1999 | Ort et al. .................... 382/124 |
| 5,933,516 | A * | 8/1999 | Tu et al. ..................... 382/125 |
| 5,982,914 | A * | 11/1999 | Lee et al. .................... 382/124 |
| 5,995,641 | A * | 11/1999 | Yamaguchi ................ 382/124 |
| 6,002,787 | A * | 12/1999 | Takhar et al. ............... 382/125 |
| 6,035,398 | A | 3/2000 | Bjorn |
| 6,069,970 | A * | 5/2000 | Salatino et al. ............. 382/124 |
| 6,078,265 | A | 6/2000 | Bonder et al. |
| 6,112,187 | A | 8/2000 | Fukawa |
| 6,154,879 | A | 11/2000 | Pare et al. |
| 6,193,152 | B1 * | 2/2001 | Fernando et al. ............ 235/380 |
| 6,219,793 | B1 * | 4/2001 | Li et al. ....................... 726/19 |
| 6,266,433 | B1 * | 7/2001 | Bolle et al. ................. 382/125 |
| 6,275,601 | B1 * | 8/2001 | Yamaguchi et al. ........ 382/124 |
| 6,304,176 | B1 | 10/2001 | Discenzo |
| 6,307,956 | B1 | 10/2001 | Black |
| 6,308,268 | B1 | 10/2001 | Audebert |
| 6,311,270 | B1 | 10/2001 | Challener et al. |
| 6,314,196 | B1 * | 11/2001 | Yamaguchi et al. ........ 382/125 |
| 6,314,425 | B1 | 11/2001 | Serbinis et al. |
| 6,401,501 | B1 | 6/2002 | Kajuch et al. |
| 6,411,728 | B1 * | 6/2002 | Lee et al. .................... 382/125 |
| 6,421,453 | B1 | 7/2002 | Kanevsky et al. |
| 6,462,444 | B1 | 10/2002 | Makkun |
| 6,539,101 | B1 * | 3/2003 | Black ......................... 382/124 |
| 6,539,380 | B1 * | 3/2003 | Moran ........................... 707/9 |
| 6,591,002 | B2 * | 7/2003 | Lee et al. .................... 382/125 |
| 6,697,947 | B1 * | 2/2004 | Matyas et al. ............... 713/182 |
| 6,731,780 | B2 * | 5/2004 | Kobayashi et al. .......... 382/124 |
| 6,766,040 | B1 | 7/2004 | Catalano et al. |
| 6,782,120 | B2 | 8/2004 | Modl et al. |
| 6,819,219 | B1 * | 11/2004 | Bolle et al. ................. 340/5.52 |
| 6,876,757 | B2 * | 4/2005 | Yau et al. .................... 382/125 |
| 6,901,155 | B2 * | 5/2005 | Xia et al. .................... 382/125 |
| H2120 | H * | 7/2005 | Cudlitz ....................... 235/382 |
| 6,993,166 | B2 * | 1/2006 | Lo et al. ..................... 382/124 |
| 7,110,581 | B2 * | 9/2006 | Xia et al. .................... 382/124 |
| 7,184,580 | B2 * | 2/2007 | Hamid ........................ 382/124 |
| 7,190,816 | B2 * | 3/2007 | Mitsuyu et al. ............. 382/124 |
| 7,277,891 | B2 * | 10/2007 | Howard et al. .............. 707/100 |
| 7,278,028 | B1 * | 10/2007 | Hingoranee ................ 713/186 |
| 7,308,708 | B2 | 12/2007 | Blume |
| 7,319,987 | B1 | 1/2008 | Hoffman et al. |
| 7,353,541 | B1 | 4/2008 | Ishibashi et al. |
| 7,423,515 | B1 | 9/2008 | Fiske et al. |
| 2001/0036300 | A1 * | 11/2001 | Xia et al. .................... 382/125 |
| 2001/0036301 | A1 * | 11/2001 | Yamaguchi et al. ........ 382/125 |
| 2001/0045458 | A1 * | 11/2001 | Polansky .................... 235/382 |
| 2002/0095588 | A1 * | 7/2002 | Shigematsu et al. ........ 713/186 |
| 2002/0111942 | A1 | 8/2002 | Campbell et al. |
| 2002/0124176 | A1 * | 9/2002 | Epstein ....................... 713/186 |
| 2002/0154795 | A1 * | 10/2002 | Lee et al. .................... 382/125 |
| 2002/0176583 | A1 * | 11/2002 | Buttiker ...................... 380/282 |
| 2003/0035569 | A1 * | 2/2003 | Chau .......................... 382/124 |
| 2003/0048173 | A1 * | 3/2003 | Shigematsu et al. ........ 340/5.52 |
| 2003/0063782 | A1 * | 4/2003 | Acharya et al. ............. 382/125 |
| 2003/0118220 | A1 * | 6/2003 | Kobayashi et al. .......... 382/125 |
| 2003/0152947 | A1 | 8/2003 | Crossman et al. |
| 2003/0156011 | A1 * | 8/2003 | Modl et al. ................. 340/5.82 |
| 2003/0158960 | A1 | 8/2003 | Engberg |
| 2003/0169910 | A1 * | 9/2003 | Reisman et al. ............. 382/124 |
| 2003/0194114 | A1 * | 10/2003 | Mitsuyu et al. ............. 382/124 |
| 2004/0068669 | A1 * | 4/2004 | Uchida ....................... 713/202 |
| 2004/0164845 | A1 | 8/2004 | Hwang |
| 2004/0187018 | A1 | 9/2004 | Owen et al. |
| 2004/0190757 | A1 * | 9/2004 | Murphy et al. .............. 382/115 |
| 2004/0199775 | A1 * | 10/2004 | Ser et al. .................... 713/186 |
| 2004/0234111 | A1 * | 11/2004 | Mueller ...................... 382/124 |
| 2004/0238621 | A1 * | 12/2004 | Beenau et al. .............. 235/380 |
| 2004/0255623 | A1 | 12/2004 | Sun et al. |
| 2004/0267387 | A1 | 12/2004 | Samadani |
| 2005/0036611 | A1 | 2/2005 | Seaton, Jr. et al. |
| 2005/0063571 | A1 * | 3/2005 | Setlak et al. ................ 382/124 |
| 2005/0063572 | A1 * | 3/2005 | Setlak et al. ................ 382/124 |
| 2005/0074147 | A1 * | 4/2005 | Smith et al. ................. 382/115 |
| 2005/0089203 | A1 * | 4/2005 | Setlak ........................ 382/124 |
| 2005/0109350 | A1 * | 5/2005 | Luloh ........................ 128/898 |
| 2005/0117786 | A1 * | 6/2005 | Schneider et al. ........... 382/124 |
| 2005/0157913 | A1 * | 7/2005 | Yau et al. .................... 382/125 |
| 2005/0193198 | A1 | 9/2005 | Livowsky |
| 2005/0210267 | A1 | 9/2005 | Sugano et al. |
| 2005/0238212 | A1 * | 10/2005 | Du et al. ..................... 382/124 |
| 2005/0249388 | A1 * | 11/2005 | Linares ...................... 382/124 |
| 2006/0107040 | A1 | 5/2006 | Fiske |
| 2006/0107041 | A1 | 5/2006 | Fiske |
| 2006/0107063 | A1 | 5/2006 | Fiske |
| 2006/0107064 | A1 | 5/2006 | Fiske |
| 2006/0107065 | A1 | 5/2006 | Fiske |
| 2006/0107067 | A1 | 5/2006 | Safal et al. |
| 2006/0107068 | A1 | 5/2006 | Fiske |
| 2006/0107309 | A1 | 5/2006 | Fiske |
| 2006/0107312 | A1 | 5/2006 | Fiske |
| 2006/0107315 | A1 | 5/2006 | Fiske |
| 2006/0107316 | A1 | 5/2006 | Fiske |
| 2006/0110016 | A1 * | 5/2006 | Smith ........................ 382/124 |
| 2006/0115131 | A1 * | 6/2006 | Wei et al. .................... 382/125 |
| 2006/0117188 | A1 | 6/2006 | Fiske |
| 2006/0133656 | A1 * | 6/2006 | Cannon et al. .............. 382/125 |
| 2006/0230284 | A1 | 10/2006 | Fiske |
| 2006/0235729 | A1 * | 10/2006 | Braithwaite et al. ........... 705/3 |
| 2007/0014440 | A1 * | 1/2007 | Lo ............................ 382/124 |
| 2007/0118754 | A1 | 5/2007 | Togashi et al. |
| 2008/0288786 | A1 | 11/2008 | Fiske |

FOREIGN PATENT DOCUMENTS

| | | |
|---|---|---|
| WO | PCT/US2005/041799 | 5/2006 |
| WO | PCT/US2005/046215 | 6/2006 |
| WO | PCT/US2006/002271 | 8/2006 |

OTHER PUBLICATIONS

Chung et al., A Hardware Implementation of Fingerprint Verification for Secure Biometric Authentication Systems, Springer-Verlag, Sep. 2004.*

Intel, Biometric User Authentication Fingerprint Sensor Product Guidelines, Intel, Sep. 2003.*

Morimura et al., Fingerprint Sensor Technology—Sensor Structure/Chip, Sensing Scheme, and System, IEEE, Oct. 2004.*

Shigematsu et al., A Wireless Battery-powered Fingerprint Identification System for Ubiquitous User Authentication, IEEE, 2004.*

Charlot et al., A Sweeping Mode Integrated Tactile Fingerprint Sensor, IEEE, 2003.*

Title: "Bio USB Flash Drive", URL: http://www.fingergear.com/bio_usb_flash_drive.php Archive URL: http://web.archive.org/web/200501105023302/http://www.fingergear.com/bio_usb_flash_drive.php Archive Date: Nov. 5, 2005, Publisher: Bionopoly LLC, pp. 2.

Title: "Computer on a Stick", URL: http://www.fingergear.com/computer_on_a_stick.php Archive URL: http://web.archive.org/web/200501105023302/http://www.fingergear.com/computer_on_a_stick.php Archive Date: Nov. 5, 2005, Publisher: Bionopoly LLC, pp. 2.

Title: "Press Release: Bionopoly Announces USB Flash Drive With Onboard Fingerprint Authentication . . ." URL: http://www.tmcnet.com/usubmit/2005/Jan/1105286.htm Publication Date: Jan. 5, 2005, Publishers: Bionopoly LLC—TMCNET.COM, pp. 2.

* cited by examiner

600

First Distinguishing Characteristic 604

Group of Black Ridges 602

Second Distinguishing Characteristic 606

800

FIG. 8   Cut 802

BIOMETRIC PRINT QUALITY ASSURANCE

CROSS-REFERENCE TO RELATED APPLICATIONS

This application is a continuation in-part of U.S. patent application Ser. No. 11/131,652, entitled, "Method of Generating Access Keys," filed May 17, 2005; this application is also a continuation-in-part of U.S. patent application Ser. No. 11/100,803, entitled, "Determining Whether to Grant Access to a Passcode Protected Systems," filed Apr. 6, 2005; this application claims priority benefit of U.S. Provisional Patent Application No. 60/629,868, entitled, "Fingerprint Quality Assurance," filed Nov. 18, 2004; this application also claims priority benefit of U.S. Provisional Patent Application No. 60/631,199, entitled "Fingerprint Quality Assurance," filed Nov. 26, 2004; this application also claims priority benefit of U.S. Provisional Patent Application No. 60/637,536, entitled "Secure Keys," filed Dec. 20, 2004, which is incorporated herein by reference; this application also claims priority benefit of U.S. Provisional Patent Application No. 60/646,463, entitled "Passcode Generator," filed Jan. 24, 2005, which is incorporated herein by reference.

This application also incorporates herein by reference U.S. patent application Ser. No. 10/778,503, entitled "FPALM Fingerprint Authentication Lock Mechanism," filed Feb. 15, 2004. This application also incorporates herein by reference U.S. patent application Ser. No. 10/889,237, entitled "FPALM II Fingerprint Authentication Lock Mechanism II," filed Jul. 11, 2004.

This application also claims priority benefit of and incorporates herein by reference U.S. Patent Application Ser. No. 11/100,803, entitled, "Determining Whether to Grant Access to a Passcode Protected Systems," filed Apr. 6, 2005. This application also incorporates herein by reference U.S. patent application Ser. No. 11/102,407, entitled, "System for Handling Requests for Access to a Passcode Protected Entity," filed Apr. 7, 2005. This application also incorporates herein by reference U.S. patent application Ser. No. 11/104,343, entitled, "Generating Requests for Access to a Passcode Protected Entity," filed Apr. 11, 2005. This application also incorporates herein by reference U.S. patent application Ser. No. 11/104,357, entitled, "System for Generating Requests to a Passcode Protected Entity," filed Apr. 12, 2005. This application also incorporates herein by reference U.S. patent application Ser. No. 11/106,183, entitled, "Interfacing with a System that Includes a Passcode Authenticator," filed Apr. 14, 2005. This application claims priority benefit of and incorporates herein by reference U.S. patent application Ser. No. 11/106,930, entitled, "An API for a System Having a Passcode Authenticator," filed Apr. 14, 2005.

This application incorporates by reference U.S. patent application Ser. No. 11/134,123, entitled, "Using an Access Key," filed May 20, 2005. This application incorporates by reference U.S. patent application Ser. No. 11/136,851, entitled, "Setting Up a Security Access System," filed May 25, 2005. This application incorporates by reference U.S. patent application Ser. No. 11/137,886, entitled, "Assembling a Security Access System," filed May 25, 2005. This application incorporates by reference U.S. patent application Ser. No. 11/139,167, entitled, "A System that Generates Access Keys," filed May 26, 2005. This application incorporates by reference U.S. patent application Ser. No. 11/140,810, entitled, "System that Uses Access Keys," filed May 31, 2005.

FIELD

The specification generally relates to a system for securely accessing an entity.

BACKGROUND

The subject matter discussed in the background section should not be to be prior art merely as a result of its mention in the background section. Similarly, a problem mentioned in the background section or associated with the subject matter of the background section should not be assumed to have been previously recognized in the prior art. The subject matter in the background section merely represents different approaches, which in-and-of-themselves may also be inventions.

It is possible to scan fingerprints into computers, rather than enter a password, to access a secure entity. However, matching fingerprints can sometimes present difficulties.

BRIEF DESCRIPTION

In the following drawings like reference numbers are used to refer to like elements. Although the following figures depict various examples of the invention, the invention is not limited to the examples depicted in the figures.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-10 is a brief description of each element, which may have no more than the name of each of the elements in the one of FIGS. 1-10 that is being discussed. After the brief description of each element, each element is further discussed in numerical order. In general, each of FIGS. 1-14 is discussed in essentially numerical order and the elements within FIGS. 1-14 are also usually discussed in essentially numerical order to facilitate easily locating the discussion of a particular element. Nonetheless, there is no one location where all of the information of any element of FIGS. 1-14 is necessarily located. Unique information about any particular element or any other aspect of any of FIGS. 1-14 may be found in, or implied by, any part of the specification.

In the remainder of this application U.S. patent application Ser. No. 10/778,503 and 10/889,237 will be referred to as group I. U.S. patent applications having Ser. Nos. 11/100,803, 11/100,603, 11/102,407, 11/104,343, 11/104,357 11/106,183, and 11/106,930, will be referred to as group II. U.S. patent applications having Ser. Nos. 11/131,652, 11/134,123, 11/136,851, 11/137,886, 11/139,167, and 11/140,810 will be referred to as group III.

Figure 1:
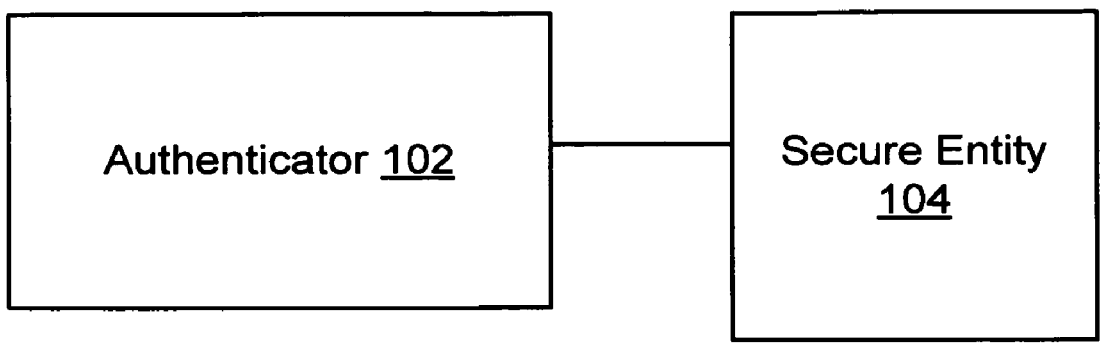
FIG. 1 shows a security a system.

FIG. 1 shows a secure system 100. Secure system 100 may include biometric print authenticator 102 and secure entity 104. Secure system 100 may not include all of the components listed above or may have other components in addition to and/or instead of those listed above.

Secure system 100 is a system to which access by unauthorized users is deterred. Biometric print authenticator 102 authenticates biometric prints of a user. In this specification, any place that the term biometric print appears as a stored or acquired entity, it should be understood that the biometric print may be an image of a biometric print or another representation. If biometric print authenticator 102 authenticates a biometric print (therein determining that the biometric prints read are those of an authorized user), then biometric print authenticator 102 allows the user access to an entity that is desired to be kept secure (a secure entity). Biometric print authenticator 102 may grant access to an individual, for example, to use a device or gain entry to a building, car, or any of a number of other entities. Biometric print authenticator 102 can be used as an alternative to the use of a key or combination. Access may be in any of a number of forms. For example, access may be in a physical form, such as permitting the user to open a door and enter a location, or it may be electronic in nature, such as granting access to a PC or to an online database. Biometric print authenticator 102 may be incorporated within the passcode device of group II or the secure entity of group III.

Secure entity 104 is an entity to which the user desires to limit access such that unauthorized users will find it difficult to gain access. Biometric print authenticator 102 reduces the likelihood of unauthorized users accessing secure entity 104. Secure entity 104 may be a building, car, or computer for example. Secure entity 104 may be the lock mechanism of group I. Similarly, secure entity 104 may be the secure entity or the administrator of group II. In this specification the degree to which various entities match is discussed.

Although at various places a minimum or maximum may be discussed or whether a quantity is above or below a certain value is discussed, different embodiments may be obtained by switching minimums for maximums and switching high quantities for low quantities, by changing the scheme used to quantify the quantity in question. For example, changing the sign of a quantity changes whether the minimum or maximum value of the quantity is the best value and changes whether it is desirable for a quantity to have a value that is below or above a threshold value.

Figure 2:
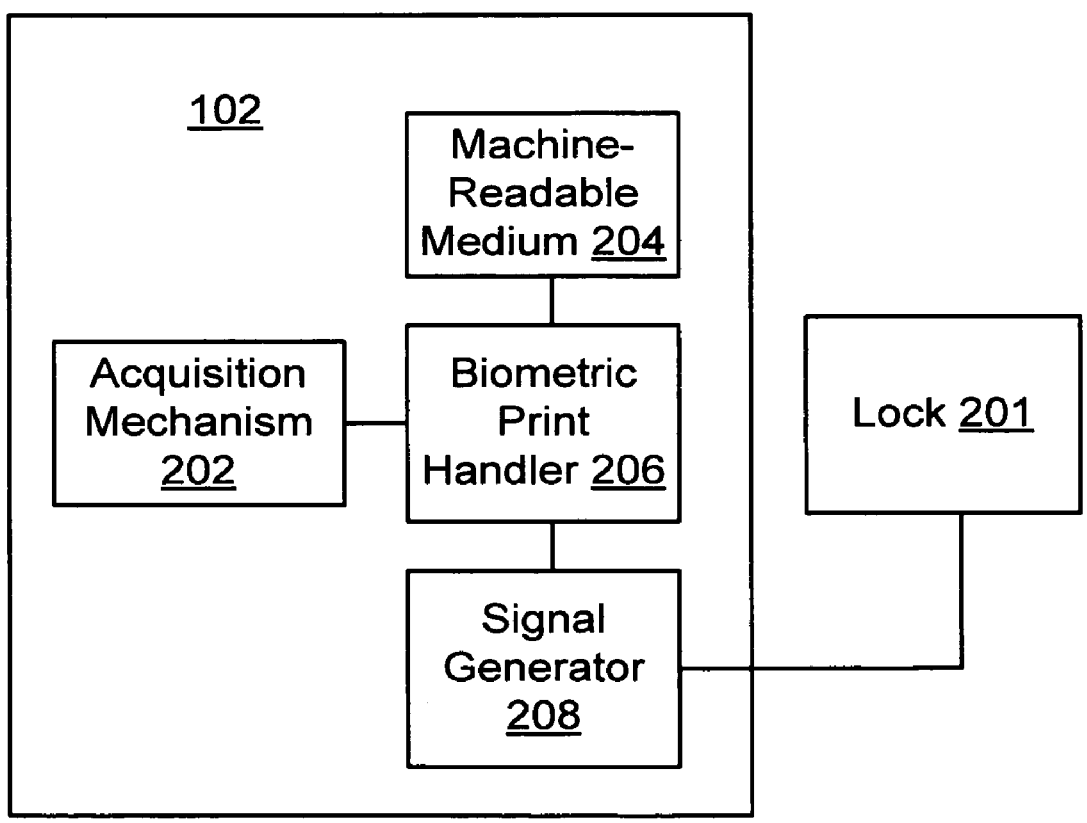
FIG. 2 shows a block diagram of a system including at least a biometric print authenticator and a lock.

FIG. 2 shows a block diagram of a system 200, which may include biometric print authenticator 102 and lock 201. Biometric print authenticator 102 may include acquisition mechanism 202, machine-readable medium 204, biometric print handler 206, and signal generator 208. System 200 may not include all of the components listed above or may have other components in addition to and/or instead of those listed above.

System 200 may be a subsystem of secure system 100. Lock 201 may be a part of secure entity 104 or may be a mechanism that is attached to a part of secure entity 104. Lock 201 reduces the likelihood of an unauthorized user accessing secure entity 104. For example, if secure entity 104 is a locker, lock 201 may be a padlock. If secure entity 104 is a car, lock mechanism may be the key lock for a car door or for the ignition. Lock 201 may be the lock mechanism of group I. Alternatively, lock 201 may be software that allows the user to access an encryption algorithm for creating a registration code and/or password within groups II or III.

Acquisition mechanism 202 acquires biometric prints and acquires information about biometric prints. In this specification, the words "acquired," "collected" and "taken" (and their conjugations) may substituted one for another to refer to the process of acquiring, collecting, and/or taking biometric prints. Acquisition mechanism 202 may be a sensor such as a camera or other mechanism for sensing a biometric print. There are many types of sensors that may be used for acquisition mechanism 202. For example, acquisition mechanism 202 may collect an image of (e.g., an optical image of) at least a portion of a biometric print. Alternatively, acquisition mechanism 202 may include a biometric print sensor pad (e.g., a fingerprint sensor pad), which may be a sweep type sensor, for example. If acquisition mechanism 202 is a fingerprint sensor or another type of biometric print sensor, an individual places his/her biometric features (e.g., by placing a finger) onto a biometric print sensor pad, or in the case of a "sweep" type sensor, an individual swipes his/her biometric features over the biometric print sensor in order for acquisition mechanism 202 to acquire his/her biometric print. Acquisition mechanism 202 may be the acquisition mechanism of the circuit of the passcode device of group II or the acquisition mechanism of the secure entity of group III.

Machine-readable medium 204 may include one or more machine-readable media. Machine-readable medium 204 may store user information and/or instructions for carrying out various methods associated with acquiring biometric prints, improving the quality of the biometric prints, registering a new user, and/or comparing newly acquired biometric prints to stored biometric prints. Machine-readable medium 204 may be onboard (e.g., integrated within) a processor or other circuitry of biometric print authenticator 102. In this specification, the term machine-readable medium is computer readable by a machine such as magnetic memory, optical memory, magneto-optical memory, punchcards, and solid state memory. Machine-readable medium 204 may be included within the secure area of group II and/or within the memory within the secure area of group III. Machine-readable medium 204 is discussed further in conjunction with FIGS. 3 and 9.

Biometric print handler 206 handles biometric prints acquired by acquisition mechanism 202. Biometric print handler 206 may include software that may cause acquisition mechanism 202 to acquire a biometric print or allow acquisition mechanism 202 to acquire a biometric print. Biometric print handler 206 may analyze biometric prints for various characteristics and compare two biometric prints to determine whether the two biometric prints match. Biometric print handler 206 may also perform a number of tasks related to improving the quality of biometric prints acquired. Biometric print handler 206 and machine readable medium 204 may be separate components of biometric print authenticator 102, as depicted in FIG. 2. Alternatively, biometric print handler 206 may include machine-readable medium, which may be integrated within one of the components of biometric print handler. Biometric print handler 206 may be included within the passcode circuitry of group II and/or the encryption key circuit of the secure entity of group III. As will be discussed in conjunction with FIG. 9, biometric print handler 206 may include machine-readable media. The machine-readable medium within biometric print handler 206 may be the part of the secure area that stores the programs of group II and/or may be the part of the memory within the secure area that stores the instructions in group III.

There is a risk during the process of acquiring a biometric print that the acquired biometric print may be of poor quality due to poor positioning of a portion of the individual with respect to acquisition mechanism 202 (e.g., due to poor finger placement on a fingerprint sensor if the biometric print is a fingerprint) or due to other reasons. One possible problem with a bad positioning can result in bad biometric print image acquisition or another type of bad acquired representation of the biometric print. If the biometric print taken during initial registration is of poor quality, each subsequent biometric print image acquisition that is compared against the originally registered image is negatively affected (in this specification, the "registration" of a user refers to the enrollment of the user). If the original image is not of a minimum acceptable quality, then any subsequent attempts to match the original biometric print image are likely to result in a failed match, and, in some cases authorization may never be granted. Similarly, individuals using an improper or inconsistent finger placement technique after having previously registered may in some cases never achieve a match, even though the individual's biometric print is stored or accessible by the device. The frequency with which a registered and valid user's biometric print is rejected as a match is known as the False Reject Rate. In this specification, the word false is used to refer to a structure detected or appearing in the image that does not actually exist on the biometric print.

In an embodiment, in order to reduce an individual's false reject rate, biometric print handler 206 may be used to improve the average quality of an acquired biometric print image. In some cases, biometric print handler 206 may not only improve the average quality of the originally registered biometric print image, but may also serve to reduce an individual's false rejection rate. Biometric print handler 206 may be used for improving the quality of biometric prints acquired during the registration and/or during subsequent authorizations. Biometric print handler 206 may use any of a number of techniques to increase the likelihood that the quality of the images acquired and/or retained are of a higher quality than were these techniques not used.

Figure 3:
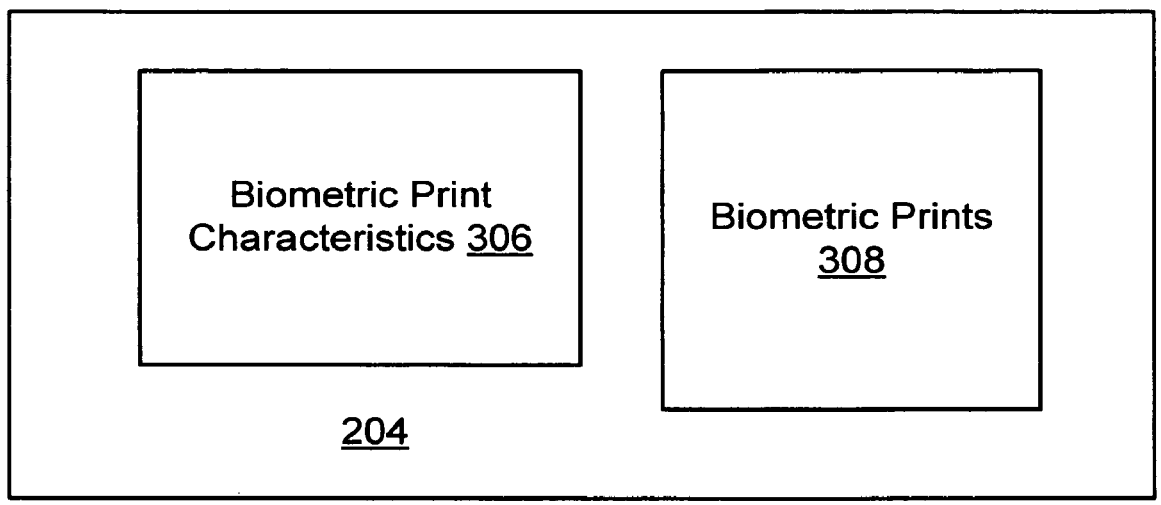
FIG. 3 shows an embodiment of a machine-readable medium used by the authenticator.

FIG. 3 shows an embodiment of machine-readable medium 204. Machine-readable medium 204 stores biometric print characteristics 306 and optionally stores biometric prints 308. Machine-readable medium 204 may not store all of the items listed above or may have other items in addition to and/or instead of those listed above.

Although in the embodiment illustrated in FIG. 3 machine-readable medium 204 does not store programs or instructions, in other embodiments machine-readable medium 204 may store programs and/or instructions. When biometric print authenticator 102 senses a biometric print of a user desiring access, the biometric print sensed is compared to biometric print characteristics 306 and determines whether there is a match. Regarding biometric print characteristics 306, in this specification, the word "minutia" is used to denote a ridge ending or a ridge bifurcation of a fingerprint. Also, in this specification, the phrase "distinguishing characteristic" is used to denote any noteworthy structure and/or unique aspects within or associated with the biometric print. A minutia may be used as a distinguishing characteristic. It should be understood that the term distinguishing characteristics when being discussed in conjunction with distinguishing characteristics that were stored or acquired refers to a representation of the distinguishing characteristics. Distinguishing characteristics may also be referred to as landmarks. Biometric print characteristics 306 may include a variety of distinguishing characteristics of a biometric print.

An example of a distinguishing characteristic is a sweat pore of a fingerprint. As another example, a distinguishing characteristic can be the number of ridges between two other distinguishing characteristics of a fingerprint. A distinguishing characteristic can be the average curvature of the fingerprint in a local region of the fingerprint. A distinguishing characteristic may be a location of a core and/or the location of structural features with respect to the core of a fingerprint. An example of a core will be discussed below in conjunction with FIG. 7. A complex distinguishing characteristic is two or more minutiae or simple distinguishing characteristics combined together. In addition to simple distinguishing characteristics, such as simple minutiae of fingerprints, complex distinguishing characteristics can also be matched between two biometric prints. A distinguishing characteristic of a fingerprint can be a ridge that is within a certain distance or number of ridges from the core of the fingerprint. A distinguishing characteristic can be a cut across the fingerprint.

Some types of distinguishing characteristics, such as minutiae, will be discussed further in conjunction with FIGS. 4-8. A representation of a biometric print that includes only, or primarily includes only, the distinguishing characteristics may be referred to as a template. Biometric print characteristics 306 may include one or more distinguishing features, such as minutiae and/or other distinguishing characteristics. Biometric print characteristics 306 may be a set of one or more templates.

Biometric print characteristics 306 may be characteristics of a biometric print that are stored permanently so that when a user wants to gain access, a scanned biometric print can be compared to biometric print characteristics 306. Additionally, or alternatively, when a user wants to gain access, the user may scan a biometric print, from which biometric print characteristics are derived. The derived biometric print characteristics may then be compared to stored biometric prints or stored biometric print characteristics 306. Biometric print characteristics 306 may be encrypted.

Biometric prints 308 may include one or more biometric print images that are stored temporarily or permanently. Biometric prints 308 may include a biometric print that is being stored temporarily while being compared to biometric print characteristics 306. Biometric prints 308 may include a biometric print that is being stored temporarily while extracting distinguishing characteristics. Biometric prints 308 may also be encrypted. Biometric print characteristics 306 and/or biometric prints 308 may be included within the user information of the passcode circuitry of group II or the user data in the secure module of group III.

Figure 4:
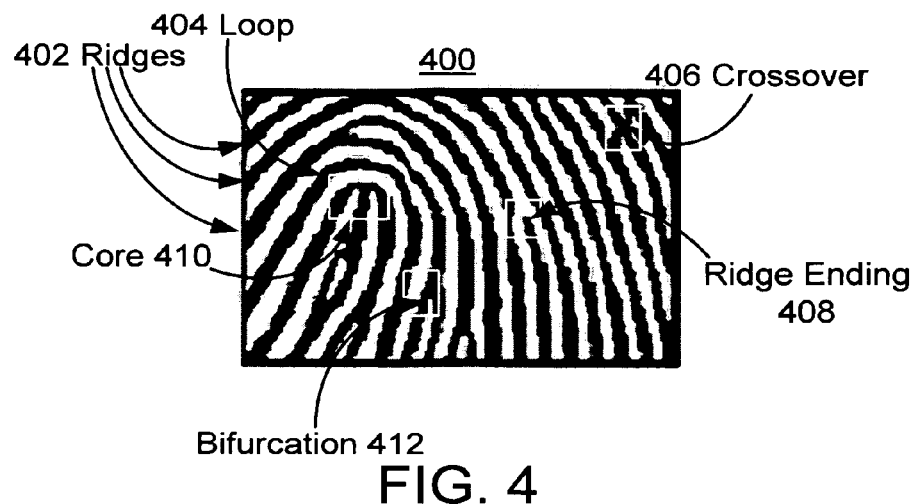
FIG. 4 illustrates a portion of a fingerprint that includes various characteristics of fingerprints that may be used as distinguishing characteristics.

FIG. 4 illustrates a portion 400 of a fingerprint that includes various characteristics of fingerprints that may be used as distinguishing characteristic within biometric print characteristics 306. Portion 400 includes ridges 402, loop 404, crossover 406, ridge ending 408, core 410, and bifurcation 412 with respect to black. (Depending on the point of view, a ridge may be referred to as a white ridge or black ridge.) FIG. 4 may contain other structures that may be used as distinguishing characteristics, but which are not discussed.

Ridges 402 are examples of black ridges that may be found on fingerprints. A ridge is a raised or lowered path structure of a fingerprint. Loop 404 is an example of structure that may be used as a distinguishing characteristic within biometric print characteristics 306. A loop is a ridge that curves at least as much as a structure having a horseshoe shape. A loop can even be a complete loop and curve as much as a circle.

Crossover 406 is located in a white box at the upper right hand corner of portion 400. Crossover 406 is another example of a structure that may be used as a distinguishing characteristic within biometric print characteristics 306. A crossover is a ridge that crosses over another ridge or stated differently a crossover is two ridges that crossover one another.

A black ridge ending 408 is located in a middle section towards the right of portion 400. Ridge ending 408 is another example of a structure that may be used as a distinguishing characteristic within biometric print characteristics 306. A ridge ending is a location on a fingerprint where a ridge terminates.

Core 410 is located in a white box in the middle section, towards the left of portion 400. Core 410 is another example of a distinguishing characteristic that may be used within biometric print characteristics 306. A core may be a central region (e.g., a loop) about which several loops are concentric.

A black bifurcation 412 is located in a white box towards the bottom of portion 400. Bifurcation 412 is another example of a structure that may be used as a distinguishing characteristic within biometric print characteristics 306. A bifurcation is a location where one ridge splits into two ridges. A point where a ridge splits into more than two ridges may also be used as a distinguishing characteristic.

Figure 5:
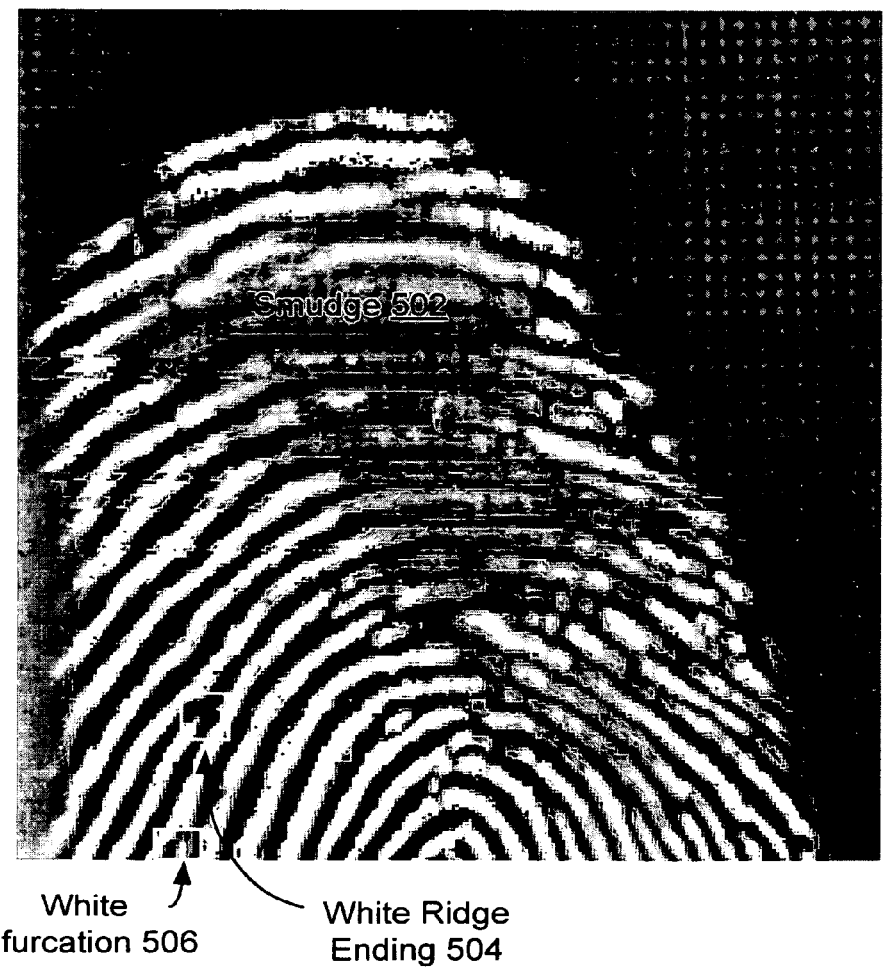
FIG. 5 illustrates a portion of an actual fingerprint image and various characteristics of fingerprints that may be used as distinguishing characteristics.

FIG. 5 illustrates a portion 500 of an actual fingerprint image. Portion 500 includes smudged region 502, white ridge ending 504 and white bifurcation 506. FIG. 5 contains other features and structures that may be used as distinguishing characteristics, but which are not discussed.

Smudged region 502 is an example of a region containing data errors. Smudged region 502 may have resulted from perspiration, skin oils, and/or the user incorrectly placing a finger on acquisition mechanism 202. Smudged region 502 will be referred to in the discussion of FIG. 9 below. The white rectangle at the bottom and left part of FIG. 5 surrounds a white ridge ending 504. The white box above white ridge ending 504 and slightly to the right surrounds a white ridge bifurcation 506.

Figure 6:
FIG. 6 illustrates a portion of an actual fingerprint image that includes another type of a characteristic that may be used as a distinguishing characteristic.

FIG. 6 illustrates a portion 600 of a fingerprint that includes another type of a characteristic that may be used as a distinguishing characteristic within biometric print characteristics 306. Portion 600 includes a group of black ridges 602, a first distinguishing characteristic 604, and a second distinguishing characteristic 606. FIG. 6 may contain many other distinguishing characteristics that are not discussed.

In FIG. 6, there is a group of ridges 602 between two distinguishing characteristics, which may be used as a distinguishing characteristic within biometric print characteristics 306. Although in the specific example of FIG. 6 group of ridges 602 includes three ridges, any number of ridges could be used. Although in FIG. 6 there are three distinguishing characteristics, any number of characteristics may be used. The specific number of ridges in the group may be used as a distinguishing characteristic. First distinguishing characteristic 604 and second distinguishing characteristic 606 are a black bifurcation and a white sweat pore, respectively, which demark the location of group of ridges 602. Although, first distinguishing characteristic 604 is a black bifurcation and second distinguishing characteristic 606 is a white sweat pore, any minutia or other distinguishing characteristics may be used for either or both of first distinguishing characteristic 604 and second distinguishing characteristic 606.

Figure 7:
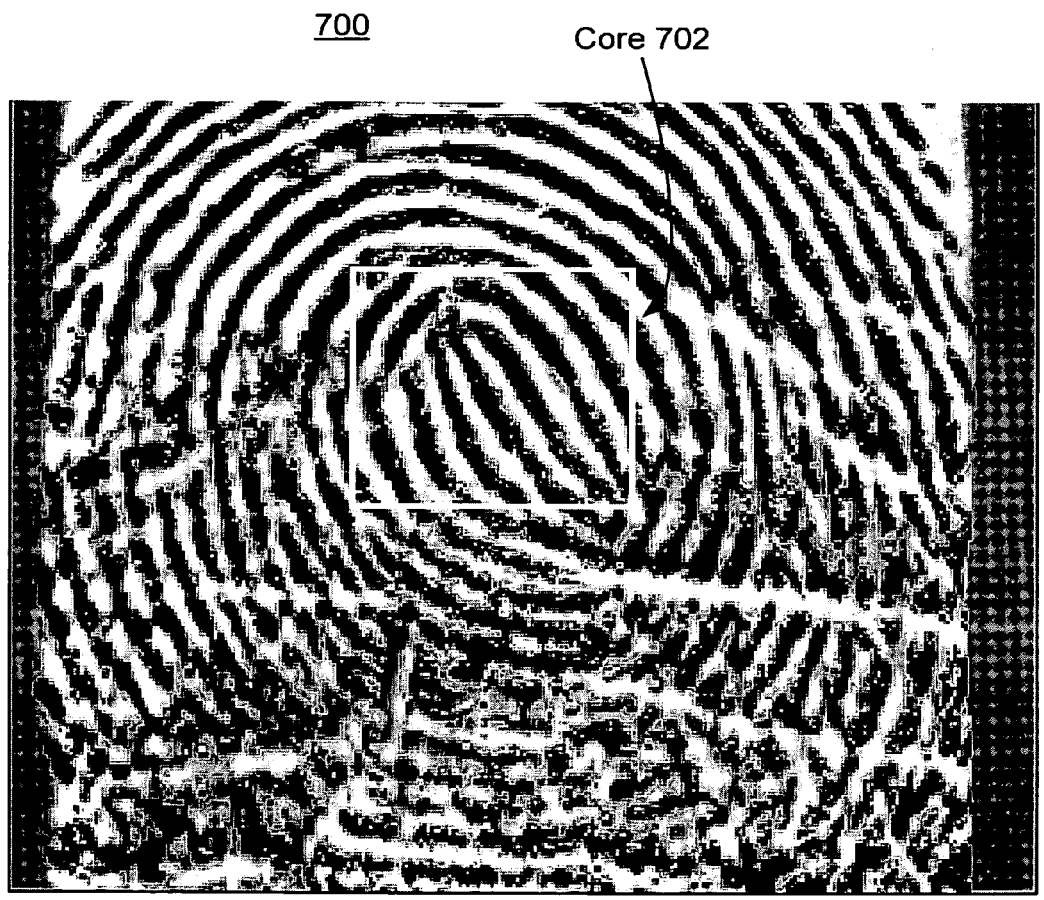
FIG. 7 illustrates a portion of another fingerprint image that includes another type of a characteristic that may be used as a distinguishing characteristic.

FIG. 7 illustrates portion 700 of an actual fingerprint image. Portion 700 include core 702. FIG. 7 may contain many other distinguishing characteristics that are not discussed.

In FIG. 7, a white rectangle surrounds core 702. Core 702 is the innermost loop about which other ridges loop around. Core 702 is a distinguishing characteristic that may be used within biometric print characteristics 306. Core 702 is formed from loops that are essentially circular, while in contrast the loops of core 410 are formed from essentially horseshoe shaped loops.

Figure 8:
FIG. 8 illustrates the portion of the fingerprint image illustrated in FIG. 7. However, FIG. 8 highlights another type of a characteristic that may be used as a distinguishing characteristic.

FIG. 8 illustrates a portion 800 of a fingerprint, which is the same portion as portion 700 of FIG. 7. In FIG. 8, another type of a characteristic is highlighted via a white box, which includes a cut 802. Cut 802 may be used as a distinguishing characteristic within biometric print features 306. As indicated in the BRIEF DESCRIPTION, portion 800 is the same as portion 700, except a different white box is used to highlight a different region of portion 800.

In FIG. 8, a white rectangle surrounds a cut distinguishing characteristic 802. Cut 802 may be any portion of adjacent distinguishing characteristics and/or ridges that have been severed. The group of severs form a line, which makes up cut 802. Cut 802 may be a permanent injury, a scar, or a naturally occurring skin formation.

Figure 9:
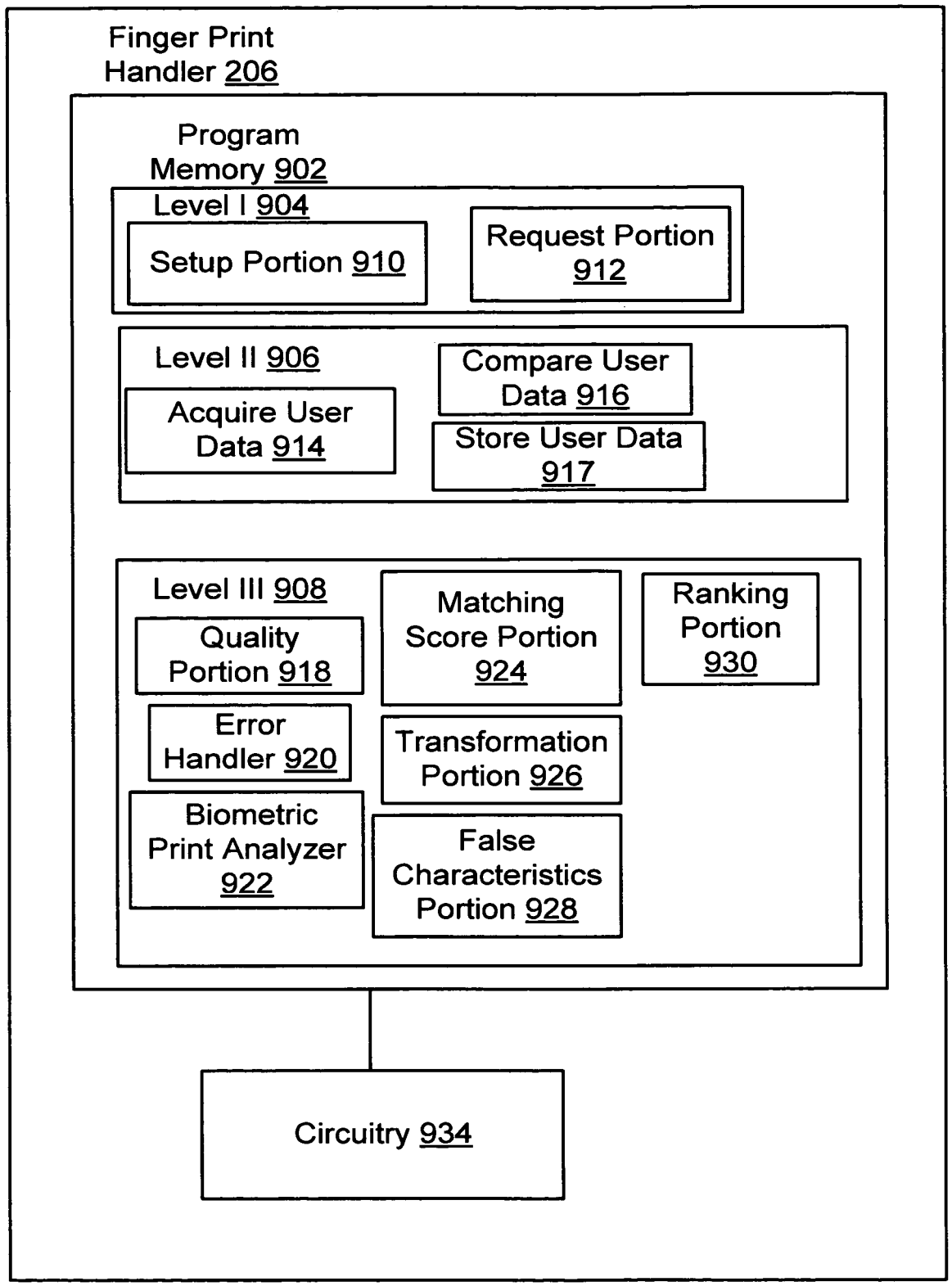
FIG. 9 shows an embodiment of a block diagram of a biometric print handler.

FIG. 9 shows an embodiment of a block diagram of biometric print handler 206. Biometric print handler 206 may include program memory 902, which stores level I 904, level II 906, and level III 908. Level I 904 may include setup portion 910 and request portion 912. Level II 906 may include acquire user data 914, compare user data 916, and store user data 917. Level III 908 may include quality portion 918, error handler 920, biometric print analyzer 922, matching score portion 924, transformation portion 926, false characteristics portion 928, and ranking portion 930. Biometric print handler 206 may also include circuitry 934. Biometric print handler 206 may not include all of the components listed above or may have other components in addition to and/or instead of those listed above.

Program memory 902 may include a machine-readable medium capable of storing information. Program memory 902 may store one or more instructions (e.g., which make up one or more programs) that are implemented by biometric print handler 206. Program memory 202 may be part of machine-readable medium 204 and/or may be onboard memory of (e.g., memory integrated within) a processor or other fingerprint handling circuitry. Program memory 902 may be the part of the secure area that stores the programs of group II, or may be the part of the memory of the secure area that stores the instructions of group III.

Level I 904, level II 906, and level III 908 represent hierarchical divisions of the instructions stored in program memory 902. These instructions also could be part of the hardware architecture to reduce costs and increase speed. Although level I 904, level II 906, and level III 908 are depicted as being located in separate contiguous regions of program memory 902, the instructions that make up any one of the levels may be interspersed among the other levels. The instructions stored in level I 904 may invoke the instructions stored in level II 906, and the instructions stored in level II 906 may invoke the instructions stored in level III 908. In one embodiment, the instructions stored in level I 904 may not directly invoke the instructions stored in level III 908, level III 908 may not invoke instructions from level I 904 or level II 906, and instructions from level II 906 may not invoke instructions from level I 904. In another embodiment, the instructions stored in level I 904 may directly invoke the instructions stored in level III 908. In another embodiment, in general, the instructions stored in level III 908 will not usually invoke the instructions stored in level I 904 or level II 906, and the instructions stored in level II 906 will not usually invoke the instructions stored in level I 904. However, the instructions associated with any level may invoke instructions at any other level.

Setup portion 910 may register a new user, and adds a new user to a list of users that are authorized to use secure entity 104 (in this specification, the word "portion," as in setup portion 910, refers to one or more instructions, which may be part of a single programming unit, such as a function, method, module, subroutine or object, or may be interspersed between instructions of one or more other programming units). In an embodiment, in order to grant access to an individual, biometric print authenticator 102 should have a representation of the biometric print (e.g., the biometric print image or distinguishing characteristics of the biometric print) stored in a way that makes possible a comparison with a stored template, biometric print characteristics 306, and/or the individual's biometric prints 308 (e.g., any representation of the biometric print). Biometric print characteristics 306 may be obtained by any of a number of ways. In an embodiment, in order for the biometric print characteristics 306 to be stored, the individual either registers through the use of a acquisition mechanism 202, or by having a traditional ink-and-paper biometric print scanned digitally into the biometric print authenticator 102. Setup portion 910 may include, or may be included within, the setup portion of the passcode device of group II or of the method of setting up the system of group III.

Request portion 912 handles requests by users for access. A user requesting access may enter a biometric print into biometric print authenticator 102. Next, request portion 912 may compare the newly acquired biometric print to a stored biometric print. Then request portion 912 may decide whether to grant or deny access based on the comparison. Setup portion 910 and/or request portion 912 may invoke any combination of acquire user data 914, compare user data 916 and/or store user data 917. Request portion 912 may include or be included within the request of group II.

Acquire user data 914 may cause biometric prints to be acquired, and/or may cause a prompt to be presented to a user, which prompts the user to submit a biometric print. Acquire user data 914 may include other software that is needed by acquisition mechanism 202. Acquire user data 914 may be the same as the acquire user data of group III.

Compare user data 916 compares biometric prints 308 and/or biometric print characteristics 306 that are stored in machine-readable medium 204 of biometric print authenticator 102 and may compute a score that can be used for determining how closely two biometric prints match. This score is discussed below in conjunction with matching score portion 924. Additionally, or alternatively, compare user data 916 may include a decision algorithm that grants or denies access based on how close of a match exists between the characteristics (of a biometric print) stored and the biometric print that was newly acquired. If the stored biometric print characteristics 306 and the newly acquired biometric print match within a certain tolerance, then access may be granted. If no match is found between the characteristics stored and the biometric print acquired (or if the match is not close enough), access may be denied. In an embodiment, when a user is requesting access, first one or more images of the biometric print are obtained, via acquisition mechanism 202. Biometric print characteristics may be determined for one or more biometric prints 308 that were newly acquired, and then the newly acquired ones of biometric print characteristics 306 may be compared to previously stored ones of biometric print characteristics 306, via compare user data 916 to determine if it is likely that a match exists. After one or more biometric print images are compared, via compare user data 916, against one or more stored biometric print images, if it is determined that it is likely that a match exists or does not exist, access may be granted or denied, respectively.

Compare user data 916 may be used by setup portion 910 and/or request portion 912 to compare newly acquired biometric prints to one another prior to storing and/or comparing to stored biometric prints, respectively. Request portion 912 may also use compare user data 916 for comparing newly acquired biometric prints to stored biometric prints. Compare user data 916 may be included within the compare user data portion of the instructions stored within the secure area of group III.

Store user data 917 may cause a newly acquired biometric print to be stored as biometric print 308 and/or a newly derived set of distinguishing characteristics to be stored as biometric print characteristics 306. Store user data 917 may be invoked by setup portion 910 to store biometric prints for later comparison when a user requests access to secure entity 104. Store user data 917 may be the same as the store user data of the encryption key circuitry of group III.

Quality portion 918 may check the quality of newly acquired biometric prints. Quality portion 918 may be the acquisition function discussed in U.S. Provisional Patent Application Nos. 60/629,868 and 60/631,199. In an embodiment, each scanned biometric print is checked by quality portion 918 and is required to have a certain minimum quality. In one embodiment, to increase the likelihood that a biometric print is above a certain quality, acquire user data 914 causes quality portion 918 to be applied to every image of a biometric print to determine a quality, and a decision is made by quality portion 918 and/or acquire user data 914 whether to reject or accept the scanned image based on the quality determined by quality portion 918.

There are many possible criteria (associated with the quality) that may be used by quality portion 918 to determine whether to accept or reject the biometric print. For example, there may be a requirement that the acquired biometric print image be greater than a certain size. There may be an additional or an alternative requirement that the standard deviation of adjacent pixel values and/or of pixel values of the same slice be below a threshold value. In some cases, the additional requirement is the standard deviation of the pixel values in a number of blocks in the image is above a threshold value. If the image scanned does not meet the required criteria of quality portion 918, the image may be thrown out. Quality portion 918 may be invoked by, or incorporated within, acquire user data 914. Quality portion 918 may be invoked by, or may invoke compare user data 916, to facilitate determining which biometric print images, and/or which templates, associated with a single user are retained from a set of newly acquired biometric print images and/or a corresponding set of newly acquired templates as representative of the biometric print of the user.

Quality portion 918 may be invoked by setup portion 910 to ensure that the biometric prints stored are likely to be of a certain minimum quality prior to being used for determining whether to grant access to a user. Similarly, quality portion 918 may be invoked by request portion 912 to ensure that a newly acquired biometric print is likely to be of certain minimum quality prior to comparing the newly acquired print biometric to a stored biometric print. Quality portion 918 may include, or may be included within, the acquire user data portion of the instructions of the secure area of group III.

Error handler 920 is optional. Error handler 920 performs procedures that are expected to correct for errors that may have occurred while acquiring a biometric print image. Error handler 920 may be invoked by quality portion 918 and/or may be invoked prior to comparing biometric prints (using compare user data 916) to determine if the biometric prints match. Error handler 920 may include a variety of error correction algorithms, which may interpolate and/or otherwise correct data points that appear to be erroneous or data points that are missing, for example. In an embodiment, if there are too many errors that need to be corrected, the biometric print may be thrown out (e.g., by quality portion 918) instead of correcting the errors. Setup portion 910 and/or request portion 912 may use error handler 920 to ensure that the biometric prints stored and/or newly acquired, respectively, are likely to be of a certain minimum quality. Error handler 920 may be included within the acquire user data 914 and/or compare user data 916.

Biometric print analyzer 922 may determine various distinguishing characteristics of a biometric print, which may be stored for later comparison with biometric prints of a user requesting access to secure entity 104. Biometric print analyzer 922 may determine distinguishing characteristics, such as minutiae and/or other distinguishing characteristics. In one embodiment, a requirement may be incorporated within biometric print analyzer 922 that a minimum number of distinguishing features are contained within the biometric print in order for the biometric print to qualify as valid for the purpose of matching the biometric prints 308 initially obtained to biometric prints 308 sensed at a later time when requesting access. An image without sufficient distinguishing features may be too difficult to authenticate with a high degree of accuracy and may therefore be discarded by quality portion 918.

In an embodiment, a biometric print with at least the minimum number of distinguishing features may be used by setup portion 910 to register a new user, and then the biometric print may be stored as one of biometric prints 308 for comparison against others of biometric prints 308 when the user later requests access. For example, newly acquired biometric prints (which may be included in biometric prints 308) or corresponding newly acquired biometric print characteristics (which may be included in biometric print characteristics 306) may be either rejected or accepted by biometric print handler 206, depending upon whether or not there are at least the minimum number of distinguishing features found by quality portion 918 in the biometric print. Quality portion 918 may invoke biometric print analyzer 922 and/or biometric print analyzer 922 may invoke quality portion 918 to determine whether to discard or keep a newly acquired biometric print. Acquire user data 914 may invoke biometric print analyzer 922 so that only the distinguishing characteristics need to be stored instead of storing the entire biometric print.

Alternatively, the entire biometric print may be stored. Setup portion 910 and/or request portion 912 may use biometric print analyzer 922 to extract distinguishing characteristics which are stored (by setup portion 910) or which are compared (by request portion 912) to distinguishing characteristics that are stored. Biometric print characteristics 306 are determined, via biometric print analyzer 922, and then compared to one another via compare user data 916. Biometric print analyzer 922 may be included within acquire user data portion and/or the compare user data portion of the instructions stored within the secure area of group III.

Matching score portion 924 is optional. Matching score portion 924 computes a matching score for two biometric prints as a measure of the degree to which two biometric prints match. Compare user data 916 may invoke matching score portion 924 to determine a degree to which two or more biometric prints match one another. In an embodiment, when obtaining a biometric print from a user, via acquisition mechanism 202, a matching score may be determined, via matching score portion 924, by comparing two images against one another to determine if the two images have characteristics that are sufficiently close to confirm a match between the characteristics being compared. If the matching score is too low, one or both of the images compared to one another may be discarded by compare user data 916. The user may then again submit his/her biometric print to acquisition mechanism 202 for image acquisition until the quality of the match between two or more images is sufficient (e.g., until two or more biometric prints have a matching score above a given threshold).

In an embodiment, a biometric print with a good enough matching score may be used by setup portion 910 to register a new user and then stored for comparison by compare user data 916 against other biometric prints 308. In an embodiment, one matching score is computed for each possible combination of two biometric print images. In another embodiment, when a user requests access, first one or more representations (e.g., images and/or templates) of the biometric prints are obtained (from the user), and matching scores are computed that represent the degree to which the newly acquired biometric prints match one another. Then those newly acquired biometric prints that have a good enough matching score (e.g., a high enough or a low enough matching score) are determined. The one or more biometric print representations obtained that have a good enough score are compared by compare user data 916 against stored representations of biometric prints 308 to grant or deny access. Matching score portion 924 may be included within acquire user data portion and/or the compare user data portion of the instructions stored within the secure area of group III.

For example, during a setup phase, setup portion 910 keeps requesting setup biometric print images until at least n images are of sufficient quality as determined by quality portion 918 and/or biometric print analyzer 922. In an embodiment, the setup portion 910 continues to request more scanned images until at least n biometric prints are of sufficient quality, where n is a whole number greater than or equal to 1. In an embodiment, n is at least 2. Then, once a plurality of biometric prints are acquired that are determined to be satisfactory, at least three biometric prints (e.g., A, B, and C) are compared to one another to determine the best biometric prints.

Let the matching score function be represented by m. The possible matching scores that can be computed for biometric prints A, B, C are m(A, B), m(B, A), m(A, C), m(C, A), m(B, C), and m(C, B). In an embodiment, for a given set of biometric prints, all possible matching scores are computed. Thus, for three images, matching score portion 924 may compute the six matching scores m(A, B), m(B, A), m(A, C), m(C, A), m(B, C), and m(C, B). The matching scores may be used by biometric print handler 206 to determine the best biometric prints of the n biometric prints acquired. Based on these six matching scores the best two images may be chosen, and the third image may be discarded. Alternatively, the third biometric print may be discarded only if the biometric print's combined matching score or its set of matching scores indicates that the third biometric print is significantly less reliable than the score of the other two biometric prints.

The reason that m(A, B), and m(B, A) may both be computed is that not all matching score functions are symmetric. A symmetric function satisfies the following property that for any two biometric print images X and Y, m(X, Y)=m(Y, X). When the matching score function is symmetric, then for three images A, B, and C the algorithm may only compute m(A,B), m(A,C), and m(B,C). Although in this example, for any two biometric prints X and Y, if m(X,Y) and m(Y,X) are not symmetric, both m(X,Y) and m(Y,X) are calculated, in another embodiment, only one of m(X,Y) and m(Y,X) is calculated even though m(X,Y) is not symmetric. For example, m(X,Y) and m(Y,X) may be assumed to be symmetric even though m(X,Y) and m(Y,X) may not be symmetric. In an embodiment, if the difference between m(X,Y) and m(Y,X) is expected to be smaller that a particular threshold, only one of m(X,Y) and m(Y,X) are calculated. Alternatively, m(X,Y) and m(Y,X) are symmetrical and therefore only one is computed. Once matching score portion 924 finishes computing the matching scores, setup portion 910 continues to acquire more images until at least n high quality templates have been extracted. Two biometric prints may each have several matching scores associated with them. Matching score portion 924 is discussed further after the discussion of transformation portion 926 and false characteristics portion 928. Determining a ranking for the two biometric prints with respect to one another (based on the two sets of matching scores) is discussed below in connection with ranking portion 930.

Transformation portion 926 may compute one or more transformations that are used to determine whether two biometric prints are expected to be from the same person and/or whether the two or more biometric prints match. Specifically, prior to, or as part of, determining whether two or more biometric prints are expected to match one another, a transformation may be performed. A range of transformations may be chosen by transformation portion 926 that best matches the minutiae and/or other distinguishing characteristics of a biometric print A to the minutiae and/or other distinguishing characteristics of a biometric print B.

It should be understood that "best match" refers to a match that is better than the match obtained by any other transformation that transformation portion 926 tested. There may in fact exist transformations that result in better matches. For example, transformation portion 926 may have a set of tolerances associated with certain computations. Once the computation meets a certain tolerance, transformation portion 926 may not attempt to obtain a more accurate solution. Additionally, transformation portion 926 may include a computation of a function that represents the degree to which two biometric prints match or do not match. The function may have multiple extrema (e.g., minima or maxima), and transformation portion 926 may identify the first extremum found that is of a particular type (e.g., a minimum or a maximum) as the best fit, even though there may be another extremum that represents a better fit. In an embodiment, transformation portion 926 may use a search method that is expected to find a global extremum (a global minimum or global maximum), which is identifies as the best fit, but in some instances the identified global extremum may in fact be a local extremum. Nonetheless, in this specification, the best fit is the transformation identified as the best fit, which may be the transformation that is expected to have a better fit than any of the other transformations tested by transformation portion 926, or is otherwise expected to be the best fit by the algorithm implemented by transformation portion 926.

In an embodiment, the transformation computed by transformation portion 926 uses locally rigid transformations between one region of biometric print A to another region of biometric print B. Each locally rigid transformation includes at least a translation in the plane, denoted by the ordered pair of translations in different (e.g., in orthogonal) directions ($\Delta_x$, $\Delta_y$) and a rotation by an angle $\theta$. An example of a locally rigid transformation from a region of biometric print A to a region of biometric print B is discussed in conjunction with FIG. 10.

When execution speed of the matching algorithm is a priority, then only one rigid transformation matches the whole image of biometric print A to the whole image of biometric print B. When greater accuracy is preferred, each biometric print can be separated into many local regions. In this case, a distinct locally rigid transformation is computed between each pair of corresponding regions in biometric print A and biometric print B. In this case, locally rigid transformations match corresponding minutiae and/or other distinguishing characteristics between two biometric prints, because sometimes biometric print images suffer from translational and rotational deformations.

In an example in which the biometric prints are fingerprints, these deformations are typically caused by the user not properly placing his or her finger on the sensor, or squishing the finger in an unusual manner. In the case of sweep sensors, sweeping the finger at a varying speed across the sensor, or sweeping the finger at an angle can cause deformations in the biometric print image. In an embodiment, there is maximum allowable difference in the rotation and/or translation of adjacent portions of the biometric print. The maximum allowable difference in rotation angle and/or translation distance may depend on the size of the adjacent portions. Smaller size portions may have a smaller maximum difference in rotation angles and/or in translation distances. If the portions that are rotated and/or translated are small enough, the combined effect of the rotations may allow for various forms of twisting and/or splaying the pattern of ridges that makes up the biometric prints. By limiting the difference in the amount of rotation and/or translation between adjacent portions, it is expected that the combination of rotations and translations of all the portions will correspond to a curvilinear transformation in which the continuity of the biometric print may be maintained to within a tolerance that is proportional to the size of the portions being translated. In an alternative embodiment, there are no limits placed on the difference in the amount of rotation and/or in the amount of translation of adjacent portions. Compare user data 916 may invoke transformation portion 926 to improve the degree to which two biometric prints match prior to determining whether the biometric prints match and/or the degree to which the biometric prints match.

In an embodiment, other types of transformations are also performed by transformation portion 926, such as expansions and compressions. In a compression, adjacent ridges and/or distinguishing features are brought closer together, and in an expansion adjacent ridges and or distinguishing features are separated further apart. In another embodiment, transformation portion 926 computes transformations that may involve twisting and splaying of individual portions of the biometric print.

In another embodiment, the pattern that makes up the biometric print is transformed to a space associated with a set of basis functions. For example, the basis functions may be sines, cosines, complex exponentials, Bessel functions, Legendre functions, Laplace functions, hypergeometric functions, Chebychev polynomials, Laguerre polynomials, wavelets, any complete set of orthogonal functions, or any set of functions into which any other set of functions or biometric prints may be resolved. Different transformations (e.g., to different basis functions) may be less sensitive to certain types of noise and/or other inconsistencies between different biometric prints that may occur between two biometric prints from the same person.

In one embodiment, the biometric prints and/or the distinguishing characteristics are Fourier transformed by transformation portion 926 into spectral lines, and the spectral lines of the biometric prints and/or the spectral lines of the distinguishing characteristics are compared. The spectral lines in-and-of-themselves may be used as distinguishing characteristics in conjunction with (or to the exclusion of) other types of distinguishing characteristics (such as minutia) may be compared to determine if the two distinguishing characteristics are the same. The spectral lines are relatively insensitive to differences in the positions of the distinguishing characteristics that produced the spectral lines. The entire biometric print may be Fourier analyzed by transformation portion 926 and compared to the Fourier analysis of another biometric print, and/or individual portions of a biometric print may be Fourier analyzed and compared to the Fourier analysis of what are expected to be corresponding portions of another biometric print. Different distinguishing characteristics may have different sets of characteristic frequencies that are resolved by the taking a Fourier transform.

Similarly, by taking a transform based on a different set of basis functions, a coefficient for each of the basis functions is determined. In an embodiment, if the absolute value of a coefficient of a basis function (e.g., associated with a Fourier or other transformation) is below a given threshold it may be considered noise and therefore not significant. In an embodiment, instead of transformation portion 926 performing all of the transformations, the transformations may be performed by specialized hardware, which replaces and/or supplements transformation portion 926. For example, the Fourier transforms may be resolved optically using diffraction gratings and/or lenses.

False characteristics portion 928 detects whether distinguishing characteristics are expected to be false. False characteristics portion 928 may be incorporated within biometric print analyzer 922 and/or matching score portion 924 or may be a separate module and/or set of instructions. Whether or not incorporated within biometric print analyzer 922 and/or matching score portion 924, false characteristics portion 928 may be invoked by setup portion 910, matching score portion 924, and/or biometric print analyzer 922.

False minutiae and/or other distinguishing characteristics can be caused by sensor noise, user error, or limitations in biometric authenticator 102. False minutiae and/or other false distinguishing characteristics may decrease the accuracy, slow the execution speed, and make the template size bigger than necessary (consume precious memory). False minutiae and/or other distinguishing characteristics may increase the false rejection rate. The decrease in execution speed, decrease in accuracy, and larger than necessary memory that result from false distinguishing characteristics may have negative effects on the performance of a biometric print authenticator 102.

In an embodiment, while executing setup portion 910, since the biometric prints are expected to have come from the same user, false characteristics portion 928 may use multiple images of the same biometric print to remove some distinguishing characteristics. Specifically, in one embodiment, false characteristics portion 928 may compare two or more biometric prints that are expected to come from the same user. A distinguishing characteristic that only appears in one of the biometric prints, or in a small fraction of the biometric prints, may be presumed to be false. Consequently, false characteristics portion 928 removes and/or prevents the distinguishing characteristics identified as being false from being used to determine if a biometric print is expected to be authentic. The elimination of false minutiae and/or other distinguishing characteristics may enable setup portion 910 to improve the quality of the templates stored, reduce the template size, increase execution speed, and increase the accuracy in comparison to were the false distinguishing characteristics not removed. In one implementation, the removal of false minutiae results in a 3 fold reduction in the template size and a 5 fold increase in the matching speed. False characteristics portion 928 may be invoked by compare user data 916 to remove false distinguishing characteristics prior to comparing two or more biometric prints.

However, in determining whether to identify a distinguishing characteristic as false, it is possible that the user positioned his/her finger in a different manner (e.g., in a different orientation and/or with a different amount of pressure). Consequently, a transformation may be performed by transformation portion 926 prior to attempting to determine whether there are any false distinguishing characteristics. For example, false characteristics portion 928 may invoke transformation portion 926 to search for a transformation that improves the match between two or more biometric prints prior to determining whether a distinguishing characteristic is false. In one method of reducing the number of false distinguishing characteristics, after performing the transformation, different regions of one biometric print image are compared to regions on another biometric print image to determine if there are any corresponding minutiae and/or other distinguishing characteristic that may match. If the two distinguishing features are located in corresponding locations (e.g., after a transformation has been performed), and if the two distinguishing features are of the same type, and/or if other features match, then a match may be indicated. In contrast, if the two distinguishing features are not of the same type, not in corresponding locations, and/or if other features do not match, no match may be indicated.

In another embodiment, a representation of the probability that a given minutiae or other distinguishing characteristic of one biometric print image has a matching minutia or other distinguishing characteristic on the other biometric print image is assigned a value. The representation of the probability may be in the form of a standard deviation, average deviation and/or some other quantity. There may be a value assigned representing an estimate of the probability that two distinguishing characteristics are in corresponding locations. Similarly, there may be a value assigned representing an estimate of the probability that two distinguishing characteristics are of the same type. For example, a distinguishing characteristic identified as a bifurcation may be assigned a value representing a probability of being a crossover that is missing some data.

Other factors that may contribute to the representation of the probability that two distinguishing characteristics match are how closely the two distinguishing characteristics correspond in shape, size, and/or other features. In an embodiment, computing the representation of the probability that two distinguishing characteristics are the same may include computing a standard deviation, average absolute deviation, maximum deviation, and/or other measure of the similarity in values between potentially corresponding groups of pixel values, potentially corresponding groups of averages of pixel values, corresponding groups of spectral frequencies and/or corresponding groups of values of other representations of biometric print features associated with potentially corresponding distinguishing characteristics, respectively. If the value of the computed representation of the probability does not meet a certain pre-assigned threshold, the minutia or other distinguishing characteristic is assumed not to have a match, and if the value does meet the pre-assigned threshold, the minutia or other distinguishing characteristic is assumed to have a match.

For example, a transformation may be computed that best matches the minutiae and/or other distinguishing characteristics of a biometric print A to the minutiae and/or other distinguishing characteristics of a biometric print B. Then for each distinguishing feature of biometric print A an estimation of a probability that the distinguishing feature matches a distinguishing feature of biometric print B is computed. If a given distinguishing feature in biometric print A has no distinguishing feature for which the estimation is greater than a threshold value, the distinguishing feature is assumed to be false. Alternatively, if there is at least one more distinguishing feature in biometric print A than in biometric print B, then the distinguishing feature that is estimated to have the lowest probability of matching any of the distinguishing features in biometric print B is assumed to be a false distinguishing feature. False characteristic portion 928 may be included within acquire user data portion and/or the compare user data portion of the instructions stored within the secure area of group III.

Assume that images A, B, and C have been acquired from the same finger during setup. The symbol T may be used to represent a locally rigid transformation from a region a of biometric print A to region b of biometric print B, which is preformed by transformation portion 926. Similarly, the symbol S may be used to denote a locally rigid transformation from region a of biometric print A to region c of biometric print C, which is also performed by transformation portion 926. If transformation T pairs a ridge bifurcation, called minutia $M_A$, in region a of biometric print A to a ridge bifurcation, called minutia $M_B$, in region b of biometric print B, then a probability that minutia $M_A$ matches minutia $M_B$ is estimated. If the estimation is greater than a certain threshold value, a match is assumed to exist, and minutia $M_A$ receives a point for matching with minutia $M_B$. Similarly, if transformation S causes an estimate of a probability that a match exists between the minutia $M_A$, in region a of biometric print A and a ridge bifurcation called minutia $M_C$, in region c of biometric print C, to be over a certain threshold value, then a match is assumed to exist, and minutia $M_A$ receives an additional point for matching with minutia $M_C$. Thus, if A, B, and C are the only biometric prints of the same user, the score that may be used to determine whether ridge bifurcation $M_A$ is false is 2 (the sum of the point for matching minutia $M_C$ and minutia $M_B$).

The same scoring may also be applied to other distinguishing characteristics. For example, if there is a potential sweat pore $P_A$, in region a of biometric print A, but T cannot find a matching sweat pore $P_B$, in region b of biometric print B, then sweat pore $P_A$ receives zero points or a negative point. If there is a potential sweat pore $P_A$, in region a of biometric print A, but S cannot find a matching sweat pore $P_C$, in region c of biometric print C, then sweat pore $P_C$ receives zero points or a negative point. Alternatively, instead of summing points, the values of the representations of the probabilities of a match between distinguishing characteristics are summed. The distinguishing characteristics that have scores that do not meet a given threshold may be a designated as false by false characteristics portion 928.

Similarly, returning to matching score portion 924, the matching score m(A,B) may be computed by matching score portion 924 based on the sum of the points or the other representations of probabilities that represent matches between distinguishing characteristics of biometric prints A and B. Thus, if the above sweat pore and minutia are the only distinguishing characteristics associated with biometric prints A and B, the matching score m(A,B) is the sum of the point (or other representation of the probability of a match) that is awarded depending on whether minutia $M_A$ matches minutia $M_B$ and the point (or other representation of the probability of a match) that is awarded depending on whether (or representing the degree to which) sweat pore $P_A$ matches sweat pore $P_B$. In other words, in an embodiment, when computing whether a distinguishing feature is false, the points or representations of probabilities of a match are grouped (e.g., summed or otherwise combined) by the distinguishing feature (e.g., distinguishing feature $M_A$), while when computing matching scores the points or probabilities of a match are grouped according to biometric print pairs (e.g., the pair of biometric prints A and B).

Ranking portion 930 ranks a set of biometric prints. The ranking is indicative of which biometric print is expected to be of a higher quality and/or best represents the user's physical features associated with the biometric print. Ranking portion 930 may be used to determine which of the n biometric prints acquired should be discarded. In the example of the above set of biometric prints A, B, and C, based on the above 6 matching scores discussed in conjunction with matching score portion 924, the algorithm ranks the associated biometric prints of A, B, and C. As an example, suppose the matching scores are: m(A, B)=96, m(B, A)=99, m(A, C)=86, m(C, A)=81, m(B, C)=95, and m(C, B)=77. Which of biometric prints A, B, and C is ranked the highest depends upon the ranking algorithm used for ranking the biometric prints. There are many possible ranking algorithms that may be used to determine the rankings of the biometric print. An example of one algorithm is to take the median matching score of a biometric print against all other biometric prints. For this method, the median of {81, 86, 96, 99} is 92, so the ranking score of biometric print A would be 92. The median of {77, 95, 96, 99} is 95.5, so the ranking score of biometric print B would be 95.5. The median of {77, 81, 86, 95} is 83.5, so the ranking score of biometric print C would be 83.5.

An example of another of the possible ranking algorithms is to sum all the matching scores associated with a particular biometric print, and the biometric prints are ranked according to their sums. The sum of all the matching scores associated with A is the sum of m(A, B)=96, m(B, A)=99, m(A, C)=86, and m(C, A)=81, which is 362. Consequently, the score associated with A is 362. The sum of all the matching scores associated with B is the sum of m(A, B)=96, m(B, A)=99, m(B, C)=95, and m(C, B)=77, which is 367. Consequently, the score associated with B is 367. The sum of all the matching scores associated with C is the sum of m(A, C)=86, m(C, A)=81, m(B, C)=95, and m(C, B)=77, which is 339. Consequently, the score associated with C is 339. Since C has the lowest sum of matching scores it may be discarded. In different embodiments different numbers of biometric prints are discarded and different numbers are kept.

During the computation of a matching score m(A, B), between two biometric prints A and B, a transformation may be computed that best matches the minutiae and/or other distinguishing characteristics of biometric print A to the minutiae and/or other distinguishing characteristics of biometric print B. The transformation computed may be used in false characteristics portion 928.

Another algorithm for ranking biometric prints A, B, and C, which may be used by ranking portion 930, is based on an ordering, where there are two criteria. The first criterion determines how many of the matching scores of the biometric print with every other biometric print are greater than an acceptable matching threshold. Suppose the acceptable matching threshold is 80. For biometric print A, m(A, B)>80, m(B, A)>80, m(A, C)>80, and m(C, A)>80, so for this criteria biometric print A has a value of 4. For biometric print B, m(A, B)>80, m(B, A)>80, and m(B, C)>80, so for this criteria biometric print B has a value of 3. For biometric print C, m(A, C)>80, m(C, A)>80, and m(B, C)>80, so for this criteria biometric print C has a value of 3. Based on this criterion, biometric print A ranks higher than biometric print B and C.

Based on the first criterion, biometric prints B and C are tied at 3, so the second criterion is used, which computes the sum of each matching score of a biometric print against all other biometric prints. For biometric print B, the sum is m(A, B)+m(B, A)+m(B, C)+m(C, B)=367. For biometric print C, the sum is m(A, C)+m(C, A)+m(B, C)+m(C, B)=339. Based on the second criterion, biometric print B ranks higher than biometric print C. thus based on this algorithm, biometric print A is ranked first, biometric print B is ranked second, and biometric print C is ranked third. There may be another criterion that is used to determine the ranking of two biometric prints that have the same number of matching scores above the threshold value, and also have the same sum of matching scores. There may be any number of different criteria that each applied successively in case the prior criterion did not determine which of two or more biometric prints have a higher ranking.

The ranking of the biometric prints by ranking portion 930 may be applied to any number of biometric prints. Consider the case where there are n biometric prints that have been satisfactorily acquired and the biometric prints are $A_1, A_2, A_3, \ldots, A_n$. For biometric print $A_1$, a count is obtained of the number of matching scores from the set $\{m(A_1, A_2), m(A_1, A_3), \ldots, m(A_1, A_n), m(A_2, A_1), m(A_3, A_1), \ldots m(A_n, A_1)\}$ that are greater than the acceptable matching threshold. This number is the value of biometric print $A_1$'s first criterion. In general, for biometric print $A_i$, a count is made of the number of matching scores from the set $\{m(A_i, A_1), m(A_i, A_2), \ldots, m(A_i, A_n), m(A_1, A_i), m(A_2, A_i), \ldots, m(A_n, A_i)\}$ that are greater than the acceptable matching threshold. This number is the value of $A_i$'s first criterion.

For any two biometric prints that have a tie score for the first criterion, in an embodiment, the sum of each matching score is computed and is then used to compute the second criterion. Suppose biometric print $A_2$ and $A_4$ are tied on their highest ranked criteria. Then the sum for $A_2$ is computed, which is $m(A_2, A_1)+m(A_2, A_3)+ \ldots m(A_2, A_n)+m(A_1, A_2)+m(A_3, A_2)+ \ldots m(A_n, A_2)$. This sum for $A_2$ is compared to the sum for $A_4$. The sum for $A_4$ is $m(A_4, A_1)+m(A_4, A_2)+ \ldots m(A_4, A_n)+m(A_1, A_4)+m(A_2, A_4)+ \ldots m(A_n, A_4)$. If the sum for $A_2$ is bigger than the sum for $A_4$, then $A_2$ is ranked higher than $A_4$. If the sum for $A_4$ is bigger than the sum for $A_2$, then $A_4$ is ranked higher than $A_2$. In the case where the sums are the same, then $A_4$ and $A_2$ are ranked at the same level.

In an embodiment, instead of first collecting n biometric prints and then using ranking portion 930 to select a particular number of the biometric prints having the best biometric prints, the quality of each new biometric print may be determined by the biometric print's matching score against the other biometric prints. Specifically, in this embodiment, biometric prints are acquired one at a time, and after each biometric print is acquired the biometric print is ranked relative to the other biometric prints already acquired. After ranking the newly acquired biometric print, depending on the ranking score computed, the newly acquired biometric print may be kept, the newly acquired biometric print may be discarded, or another biometric print may be discarded.

Setup portion 910, request portion 912, acquire user data 914, compare user data 916, store user data 917, quality portion 918, error handler 920, biometric print analyzer 922, matching score portion 924, transformation portion 926, false characteristics portion 928, and ranking portion 930 may be included within the program of the secure area of group II, the setup portion of the passcode device of group II, and/or the request portion of the passcode device of group II. Although setup portion 910, request portion 912, acquire user data 914, compare user data 916, store user data 917, quality portion 918, error handler 920, biometric print analyzer 922, matching score portion 924, transformation portion 926, false characteristics portion 928, and ranking portion 930 are depicted as distinctly different units of code, they may not be distinctly different. Specifically, any combination of setup portion 910, request portion 912, acquire user data 914, compare user data 916, store user data 917, quality portion 918, error handler 920, biometric print analyzer 922, matching score portion 924, transformation portion 926, false characteristics portion 928, and ranking portion 930 may be dispersed within any of the other units of code (such as setup portion 910, request portion 912, acquire user data 914, compare user data 916, store user data 917, quality portion 918, error handler 920, biometric print analyzer 922, matching score portion 924, transformation portion 926, false characteristics portion 928, and/or ranking portion 930).

Circuitry 934 may be one or more processors and/or a specialized circuit that carries out (e.g., executes) the instructions in program memory 902. Thus, circuitry 934 may carry out the instructions that make up quality portion 918, error handler 920, biometric print analyzer 922, false characteristics portion 928, compare user data 916, setup portion 910, matching score portion 924, and/or ranking portion 930. Alternatively, any combination of or all of setup portion 910, request portion 912, acquire user data 914, compare user data 916, store user data 917, quality portion 918, error handler 920, biometric print analyzer 922, matching score portion 924, transformation portion 926, false characteristics portion 928, and ranking portion 930 may be replaced by specialized hardware, which may be controlled by circuitry 934.

Figure 10:
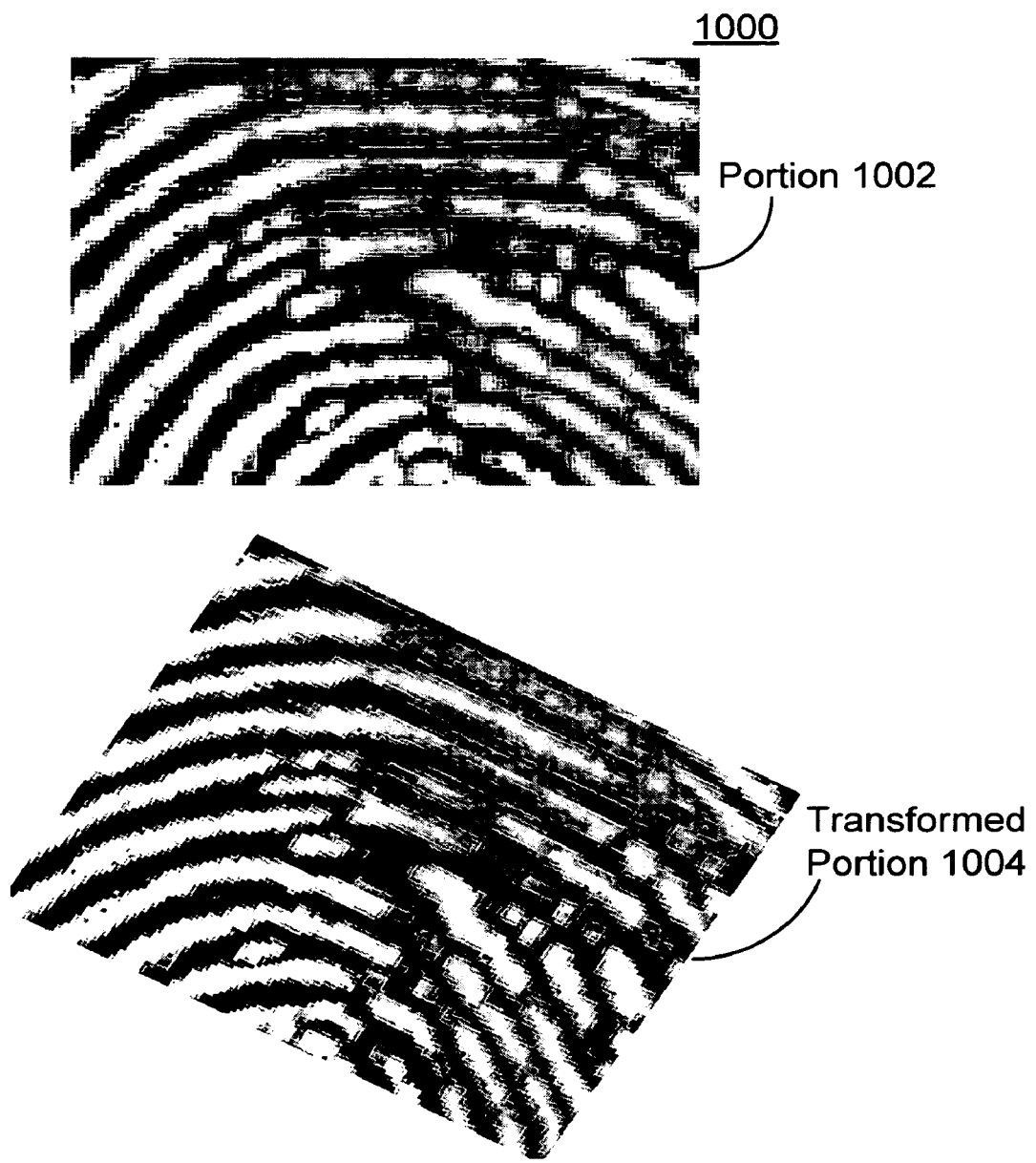
FIG. 10 shows a collection of two images of fingerprint portions.

FIG. 10 shows a collection 1000 of two biometric print portions. Collection 1000 includes a portion 1002 and a transformed portion 1004. In other embodiments, transformations may include other operations not depicted in FIG. 10.

Portion 1002 is a portion of a fingerprint prior to performing any transformations. Portion 1004 is the same portion as portion 1002, except that portion 1004 has been transformed by transformation portion 926. Specifically, in FIG. 10, the locally rigid transformation from the top region of the fingerprint to the bottom region of the fingerprint includes a translation having the vector components of $(\Delta_x, \Delta_y)=(-83, -764)$ and a rotation having a change in angle of $\theta=30$ degrees.

Regarding US patent Applications of group III, it was mentioned therein that the registration code and the passcode may be hashed or another one-way function may be applied to the registration code and passcode to encrypt the registration code and passcode. Additionally, the encrypted passcode (e.g., the hashed passcode) may be of a different length than (e.g., half the length of) the encrypted registration code (e.g., the hashed registration code).

Figure 11:
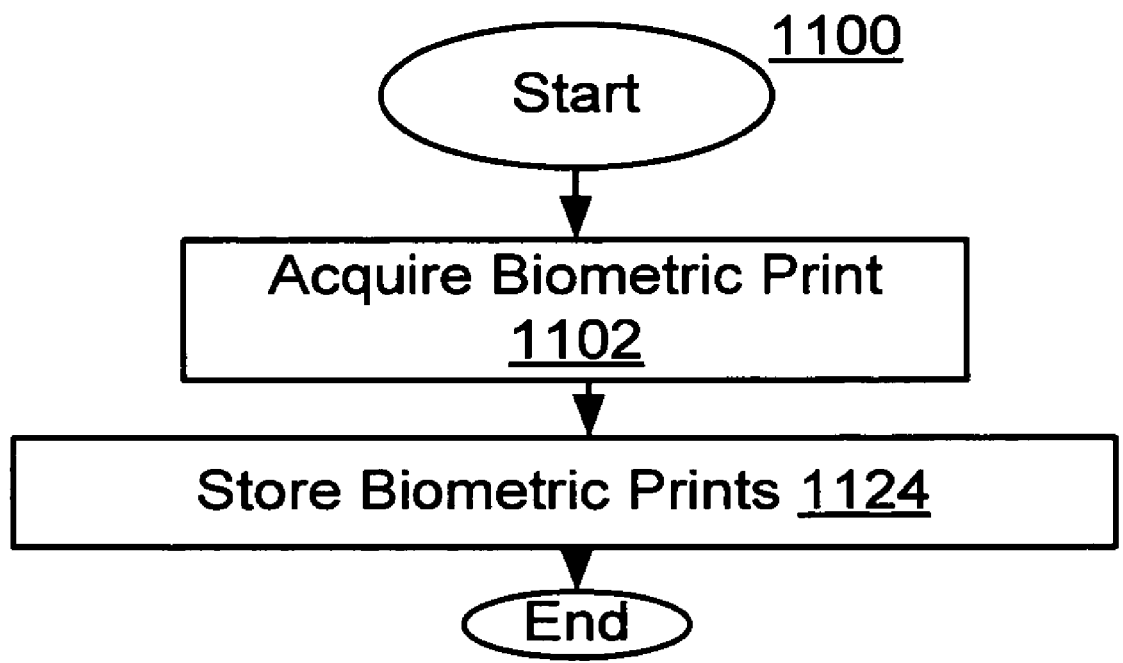
FIG. 11 is a flowchart of an example of a method of registering a new user.

FIG. 11 is a flowchart of an example of a method 1100 of registering biometric prints. Method 1100 may be an embodiment of setup portion 910. In step 1102, authenticator 102 acquires at least one biometric print using acquisition mechanism 202 and biometric print handler 206. Details of various embodiments of steps 1102 are discussed in conjunction with FIG. 13. In step 1124, the biometric prints acquired are stored using store user data 917. The stored used data may later be compared to newly acquired user data acquired from a user that is attempting to gain access to a secured entity. After step 1124, method 1100 terminates. In other embodiments, method 1100 may not include all of the above steps and/or may include other steps in addition to and/or instead of those listed above.

Figure 12:
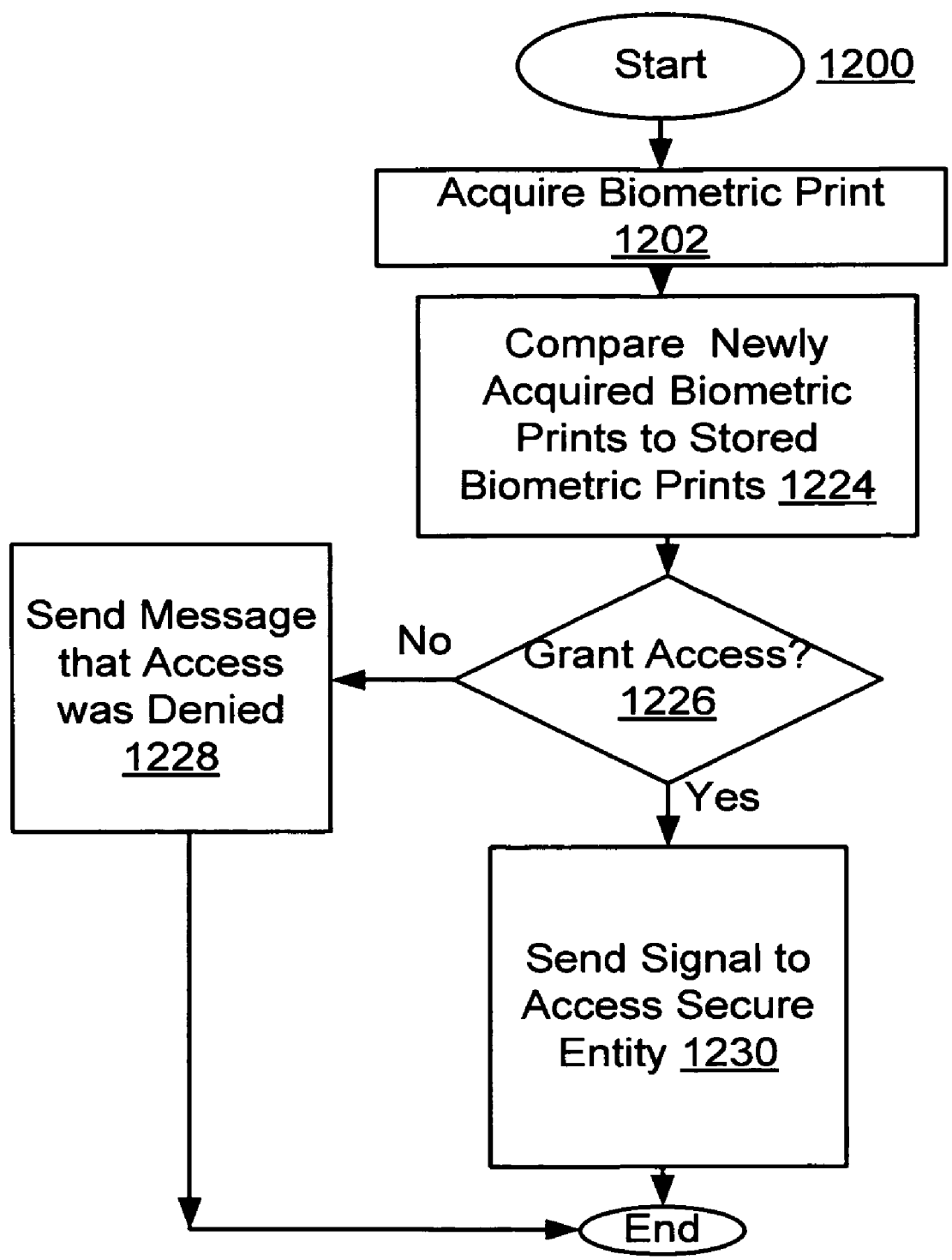
FIG. 12 is a flowchart of an example of a method of comparing biometric prints.

FIG. 12 is a flowchart of an example of a method 1200 of comparing biometric prints, which may be incorporated within setup portion 910 and/or request portion 912. In step 1202, authenticator 102 acquires at least one biometric print using acquisition mechanism 202 and biometric print handler 206. Details of various embodiments of steps 1202 are discussed in conjunction with FIG. 13. In step 1224, the biometric prints that were newly acquired during step 1202 are compared to biometric prints stored by method 1100, using compare user data 916. Step 1224 may involve computing matching scores using matching score portion 924, performing transformations using transformation portion 926 that increase the matching scores, and/or computing a ranking using ranking portion 930, for example. Next, in step 1226 a determination is made by compare user data 916 whether to grant the user access. For example, if the matching scores are not high enough, access may be denied. If access is denied method 1200 proceeds to optional step 1228. In optional step 1228, a message may be conveyed to the user that access was denied, which may terminate method 1200. Returning to step 1226, if access is granted method 1200 may proceed to step 1230. In step 1230, signal generator 208 may send signals to lock 201 of secure entity 104 allowing access to secure entity 104. Allowing access to secure entity 104 may involve allowing access to a user account, access to a website, to a computer, a vehicle, and/or a building, for example. In other embodiments, method 1200 may not include all of the above steps and/or may include other steps in addition to and/or instead of those listed above.

Figure 13:
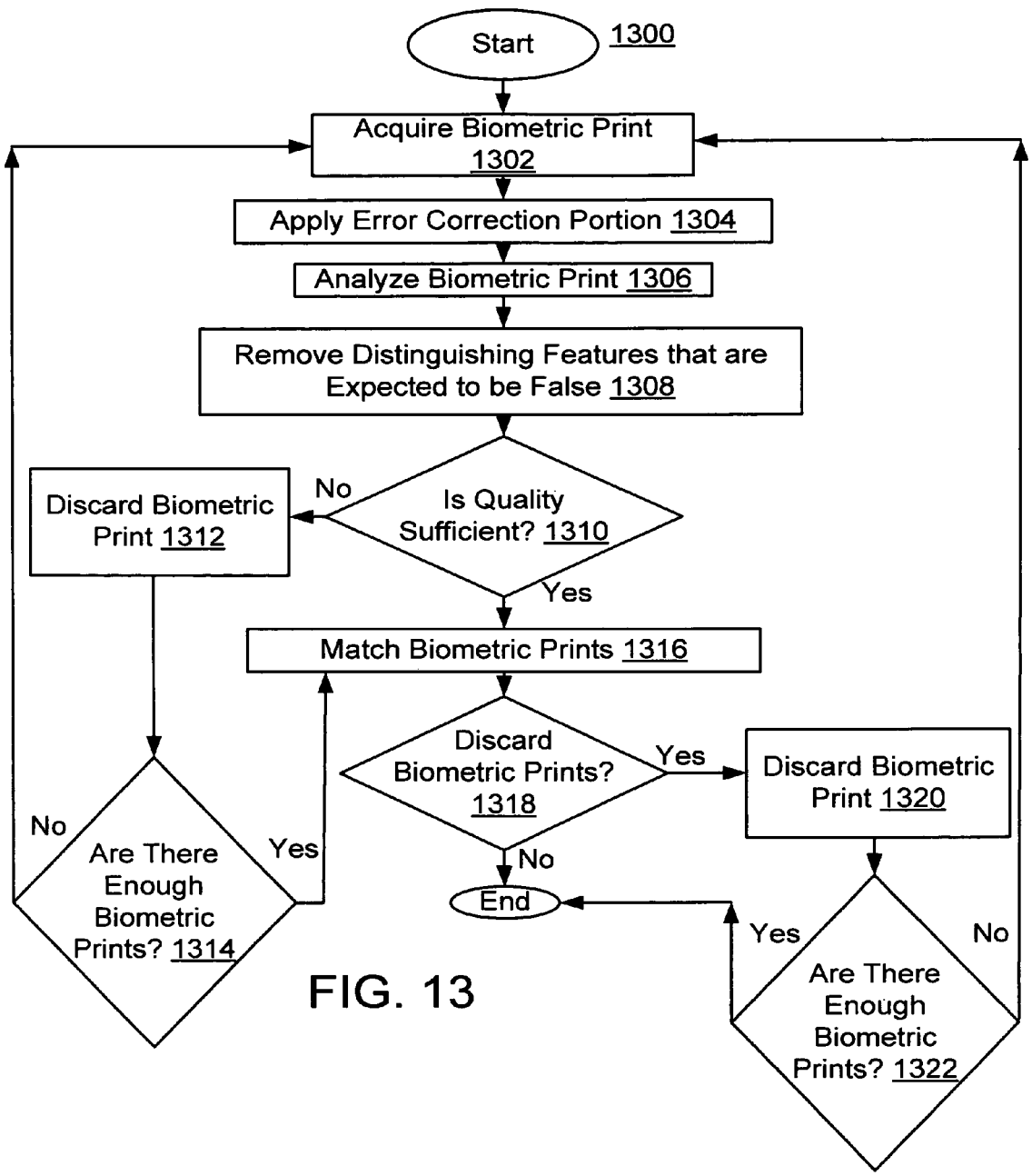
FIG. 13 is a flowchart of an example of a method of acquiring biometric prints.

FIG. 13 is a flowchart of an example of a method 1300 of acquiring biometric prints. Method 1300 may be used to implement step 1102 and/or step 1202 of methods 1100 and 1200, respectively. In step 1302, acquisition mechanism 202 acquires at least one biometric print. In optional step 1304 an error correction algorithm is applied (by error handler 920, for example) to the biometric print image acquired. In step 1306, the biometric print is analyzed by biometric print analyzer 922 to determine the distinguishing characteristics of the biometric print. In optional step 1308, distinguishing characteristics that are expected to be false are removed from the biometric prints. For example, false characteristics portion 928 may be applied to remove distinguishing characteristics that are expected to be false. In optional step 1310, a determination is made as to whether the biometric print is of a sufficient quality. For example, quality portion 918 may determine whether the biometric print has a sufficient number of distinguishing characteristics. A determination may be made as to whether other characteristics are present that characterize the quality of the biometric print image. For example, if fuzzy regions are detected and/or if more than a particular amount of missing data was detected, the biometric print image may be determined to be below a particular quality level. If there are not a sufficient number of distinguishing characteristics and/or if the quality of the biometric print is otherwise deficient, method 1300 proceeds to step 1312, where the biometric print image is discarded. For example, the biometric print image may be erased, or the memory region that stores the biometric print image may be assigned a designation that allows the biometric print image to be written over. Step 1312 may also include conveying an audio and/or text message to the user requesting that the user provide another biometric print. Next, method 1300 returns to step 1314 to determine whether there are enough biometric prints. If there are not enough biometric prints method 1300 proceed to step 1302 to acquire another biometric print. If there are enough biometric prints method 1300 proceeds to step 1316.

Returning to optional step 1310, if the quality of the biometric prints is sufficient (e.g., if there are a sufficient number of distinguishing characteristics), method 1300 proceeds to optional step 1316. In optional step 1316, newly acquired biometric prints are matched to one another. Step 1316 may involve transformation portion 926 finding transformations for portions of biometric prints that improve the match. In step 1316, matching scores may be obtained, via matching score portion 924 for one or more pairs of biometric prints. In an embodiment, transformations are chosen that maximize or at least increase the matching score. Step 1316 may also involve computing a ranking using raking portion 930.

Next, in optional step 1318, a determination is made whether to discard any of the biometric prints for which matching scores and/or rankings were computed. For example, biometric prints for which the matching scores and/or rankings that are below a certain threshold may be discarded. A select number of biometric prints that have matching scores and/or rankings that are less than the remaining biometric prints may also be discarded even if the matching scores and/or rankings are above their respective thresholds for discarding biometric prints. If in step 1318 it is determined to discard one or more biometric prints, method 1300 proceeds to optional step 1320. In optional step 1320, one or more biometric prints are discarded. Next in optional step 1322 a determination is made whether there is a need to acquire more biometric prints. If optional step 1322 determines that more biometric prints are needed, then method 1300 returns to step 1302 to acquire another biometric print. Returning to optional step 1318, if no biometric prints are discarded, method 1300 terminates.

Step 1304 may be performed at anytime, and step 1308 may be performed at anytime after step 1306, because applying an error correction algorithm and/or removing false distinguishing characteristics may improve the quality of the biometric prints stored. However, determining the quality of the biometric prints and matching the biometric prints with one another as in steps 1310 and 1316, respectively, may benefit from having step 1304 and/or step 1308 performed beforehand. Similarly, although step 1318 may benefit from step 1310, step 1310 may be performed after step 1318. In other embodiments, method 1300 may not include all of the above steps and/or may include other steps in addition to and/or instead of those listed above.

Figure 14:
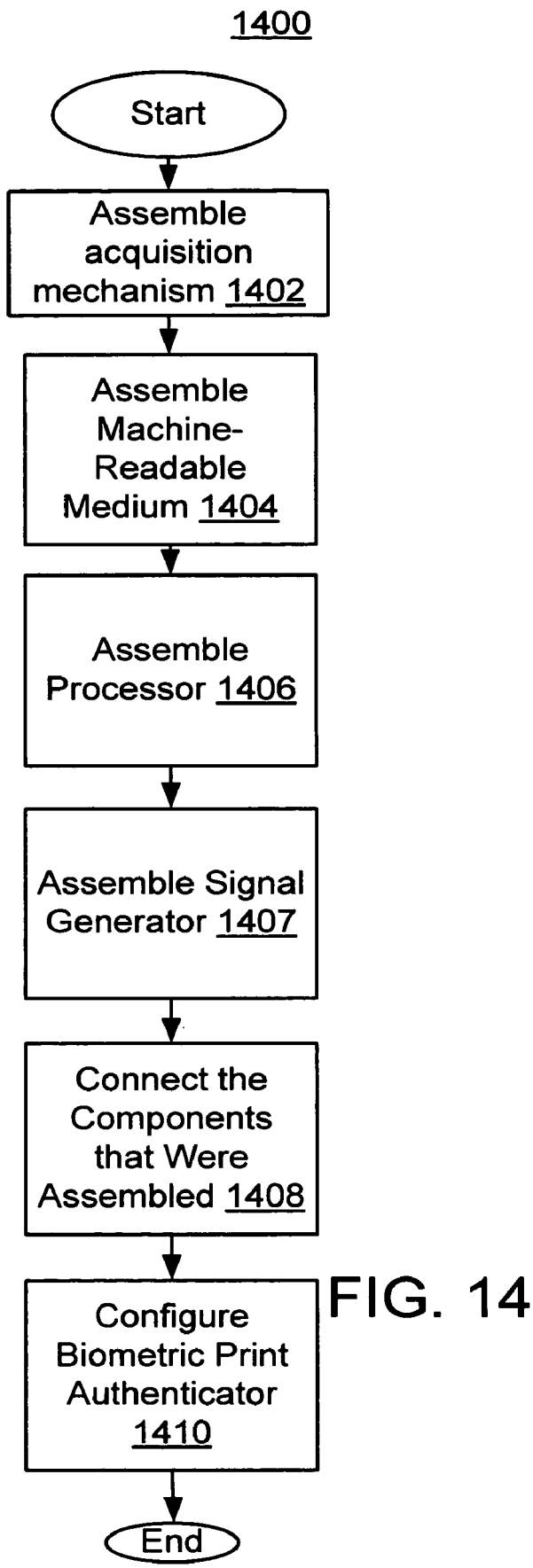
FIG. 14 shows a flowchart of an embodiment of a method of making a biometric print authenticator.

FIG. 14 shows a flowchart of an embodiment of a method 1400 of making system 100. In step 1402, acquisition mechanism 202 is assembled. In step 1404, machine-readable medium 204 is assembled. Program memory 902 may be a portion of machine-readable medium 204, in which case step 1404 may include assembling program memory 902. In step 1406, circuitry 934 is assembled. Program memory 902 may be onboard (e.g. integrated within) circuitry 934, in which case step 1406 may include assembling program memory 902. In step 1407, signal generator 208 is assembled. In step 1408, circuitry 934, signal generator 208, machine-readable medium, and acquisition mechanism 202 are connected to one another to form at least part of the hardware that makes up biometric print authenticator 102. If program memory 902 is a separate unit from circuitry 934 and machine-readable medium 204, step 1408 may include connecting circuitry 934 and/or machine-readable medium 204 to program memory 902. Step 1408 may also include connecting biometric print authenticator 102 to secure entity 104, which in one embodiment may further include connecting signal generator 208 (of biometric print handler 102) to lock mechanism 201 (of secure entity 104). In step 1410, biometric print authenticator 102 is configured. Step 1410 may include downloading into program memory 902 one or more instructions that dictate operations performed by biometric print handler 206, such as setup portion 910, request portion 912, acquire user data 914, compare user data 916, store user data 917, quality portion 918, error handler 920, biometric print analyzer 922, matching score portion 924, transformation portion 926, false characteristics portion 928, and ranking portion 930. Steps 1402-1407 may be performed in any order. Different parts of step 1408 may be performed at other times. Specifically, any time after two components have been assembled, those two components may be connected to one another. In other embodiments, method 1400 may not include all of the above steps and/or may include other steps in addition to and/or instead of those listed above.

Each of the above embodiments may be used separately or in any combination with one another. For example, an algorithm implemented for the sake of authenticating biometric prints may include any one of, any combination of, or all of requiring a minimum number of minutiae and/or other distinguishing characteristics and/or a minimum matching score to determine the best quality biometric print image or the best quality set of biometric print images for the purposes of registration of a new user and/or for comparison of a biometric print to the one or more stored biometric prints of a registered user. Additionally, any of the embodiments of this application may be used with or incorporated within any of the embodiments of any of the US patent applications incorporated herein by reference.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A machine-implemented method comprising:
    collecting a plurality of biometric prints,
        each of the plurality of biometric prints being collected within the same session;
        a portion of a body exists whose scan is included in each of the plurality of biometric prints collected;
    for each of the plurality of biometric prints determining a value associated with how many unique aspects are discernable for at least one biometric print that was obtained during a current usage;
    for each of the plurality of biometric prints determining whether to accept or reject the at least one biometric print based on a comparison of the value to a predetermined threshold;
    for each of the plurality of biometric prints accepting or rejecting the at least one biometric print, based on the determining of whether to accept or reject;
    for each of the plurality of biometric prints, at least temporarily storing the unique aspects as a representation of a set of two or more biometric prints from the plurality of biometric prints, the each biometric print being included in the set if the biometric print was accepted during the accepting or rejecting, and each biometric print not being included in the set if the biometric print was rejected during the accepting or rejecting; and
    determining whether to grant access based on a comparison of an accepted biometric print to a representation of the set of two or more biometric prints.

2. The method of claim 1, further comprising enrolling a user by storing the representation of the set of two or more biometric prints for later comparison.

3. A computer-readable medium storing one or more instructions, which when implemented, cause a processor to execute the method of claim 2.

4. A computer-readable medium storing one or more instructions, which when implemented, cause a processor to execute the method of claim 1.

5. The method of claim 1, the determining of the value being performed by at least counting how many unique aspects are discernable.

6. A machine-implemented method comprising:
    determining a value associated with a match between two or more biometric prints scanned during a current session;
    determining whether to accept or reject at least one of the two or more biometric prints based on a comparison of the value with a predetermined threshold; and
    accepting at least two biometric prints of the two or more biometric prints obtained during the current session, based on the determining of whether to accept or reject; and
    at least temporarily storing unique aspects determined to be common to each of the at least two biometric prints, as a representation of a set of biometric prints including the at least two biometric prints; and
    determining whether to grant access based on a comparison of a representation of at least one newly accepted biometric print to a stored representation of a biometric print.

7. The method of claim 6, further comprising enrolling a user by at least storing an accepted biometric print for later comparison.

8. A computer-readable medium storing one or more instructions, which when implemented, cause a processor to execute the method of claim 7.

9. A computer-readable medium storing one or more instructions, which when implemented, cause a processor to execute the method of claim 6.

10. The method of claim 6, the set includes at least two biometric prints and the unique aspects are unique aspects of each of biometric print included in the set.

11. A machine-implemented method comprising:
at least temporarily storing a collection of distinguishing characteristics of a biometric print;
comparing a plurality of biometric prints to one another;
determining one or more unique aspects associated with the biometric prints to be false based on the comparing;
not including the one or more unique aspects determined to be false within the collection of one or more distinguishing characteristics; and
determining whether to grant access to an item based on a comparison of a first collection of one or more distinguishing characteristics to a second collection of one or more distinguishing characteristics, one of the first collection and the second collection including the collection of one or more distinguishing characteristics in which the one or more unique aspects that were determined to be false were not included.

12. A computer-readable medium storing one or more instructions, which when implemented, cause a processor to execute the method of claim 11.

13. The method of claim 11, further comprising including at least one distinguishing characteristic within the collection, the at least one distinguishing characteristic coming from a biometric print from which the one or more unique aspects were determined to be false.

14. The method of claim 11, the determining that the one or more unique aspects associated with the biometric prints is false includes at least determining that the one or more unique aspects found in or biometric print is not found in at least one other fingerprint, based on the comparing.

15. A machine-implemented method comprising:
acquiring a biometric print from a user;
identifying distinguishing characteristics associated with the biometric print;
determining whether to request another biometric print from the user by at least determining whether a minimum number of biometric prints having a common set of distinguishing characteristics from the user and having an acceptable quality have been acquired during a current session, the minimum number being at least two;
if as a result of the determining, it is determined that the minimum number of biometric prints has not been acquired, presenting a request for another biometric print to the user;
at least temporarily storing the distinguishing characteristics as a representation of the biometric print; and
determining whether to grant access based on a comparison of a first set of distinguishing characteristics to a second set of distinguishing characteristics, one of the first set of distinguishing characteristics and the second set of distinguishing characteristics including the distinguishing characteristics that was at least temporarily stored.

16. The machine-implemented method of claim 15, wherein the biometric print is a fingerprint.

17. A computer-readable medium storing one or more instructions, which when implemented, cause a processor to execute the method of claim 16.

18. The machine-implemented method of claim 15, wherein the distinguishing characteristics include at least a sweat pore.

19. A computer-readable medium storing one or more instructions, which when implemented, cause a processor to execute the method of claim 18.

20. The machine-implemented method of claim 15, wherein the distinguishing characteristics include at least a termination of a ridge.

21. The machine-implemented method of claim 15, wherein the distinguishing characteristics include at least a bifurcation of a ridge.

22. The machine-implemented method of claim 15, wherein the distinguishing characteristics include at least a ridge that forms a loop that is at least partially encircled within one or more other loops.

23. The machine-implemented method of claim 15, further comprising
acquiring a new biometric print prior to the identifying; and
discarding the new biometric print if the biometric print is not of a quality that is at least as great as a threshold quality.

24. The machine-implemented method of claim 23, further comprising counting the number of distinguishing characteristics that were identified, wherein the quality is determined at least in-part by how many distinguishing characteristics were identified by the counting.

25. The machine-implemented method of claim 15, wherein the biometric print is a first biometric print and the distinguishing characteristics are a first set of distinguishing characteristics, the first set of distinguishing characteristics includes at least a first set of minutiae, and the method further comprises:
identifying a second set of distinguishing characteristics associated with a second biometric print, the second set of distinguishing characteristics includes at least a second set of minutiae;
at least one distinguishing characteristic being found in only one set of distinguishing characteristics of the first set of distinguishing characteristics and the second set of distinguishing characteristics; and
removing the at least one distinguishing characteristic from the only one set of distinguishing characteristics in which the at least one distinguishing characteristic was found, based on the at least one distinguishing characteristic not being found in another of the first set and the second set prior to the removing.

26. The machine-implemented method of claim 15, wherein the at least temporarily storing includes at least storing the biometric print in long-term storage, wherein the biometric print is available as a basis for authenticating a user requesting access to a secure entity.

27. The machine-implemented method of claim 15, further comprising:
determining whether the distinguishing characteristics match distinguishing characteristics stored in long-term memory.

28. The machine implemented method of claim 15, wherein
the biometric print is a first fingerprint;
the identifying includes at least
searching for sweat pores,
searching for bifurcations of ridges,
searching for terminations of ridges,
searching for a core including at least a ridge that forms a loop that is at least partially encircled within one or more other loops, and
searching for a cut including at least a break in one or more ridges.

29. A system comprising a processor configured to implement the method of claim 15.

30. The system of claim 29, further comprising a sensor for sensing the biometric prints.

31. The system of claim 30, further comprising one or more computer-readable media storing at least
the distinguishing characteristics; and
one or more instructions, which when executed cause the processor to implement the method.

32. A computer-readable medium storing one or more instructions, which when implemented, cause a processor to execute the method of claim 15.

33. The machine implemented method of claim 15, the distinguishing characteristics include at least a cut including at least two breaks in at least two ridges, respectively, the at least two breaks being positioned in a manner that forms a line.

34. The machine-implemented method of claim 15, the distinguishing characteristics including at least a first distinguishing characteristic, a second distinguishing characteristic, and a third distinguishing characteristic, the method further comprising
determining the second distinguishing characteristic;
determining the third distinguishing characteristic;
determining a number that represents how many ridges are located between the second distinguishing characteristic and the third distinguishing characteristic; and
storing the number as the first distinguishing characteristic.

35. The method of claim 15, the minimum number being three or greater.

36. The method of claim 15, the minimum number of biometric prints are acquired as part of registering a user as being authorized to access a secure entity.

37. The method of claim 15, the minimum number of biometric prints are acquired in response to a user requesting access to a secure entity in order to determine whether the user is authorized to access the secure entity.

38. The method of claim 15, the identifying including at least identifying a crossover as a distinguishing characteristic, the crossover includes a location on a ridge where two ridges cross one another.

39. A machine-implemented method comprising:
identifying distinguishing characteristics associated with a first biometric print of a location on a body, the distinguishing characteristics include at least a cut including at least a break in one or more ridges
identifying distinguishing characteristics associated with a second biometric print taken during the same session including the location on the body;
including the cut in a set of distinguishing characteristics for storage as representation of the location on the body only if a corresponding cut is found in at least the second biometric print;
at least temporarily storing the distinguishing characteristics as a representation of biometrics of the location on the body; and
determining whether to grant access based on a comparison of a first set of distinguishing characteristics to a second set of distinguishing characteristics, one of the first set of distinguishing characteristics and the second set of distinguishing characteristics including the distinguishing characteristics that was at least temporarily stored.

40. The method of claim 39, further comprising searching for the cut.

41. The method of claim 39, the cut including at least four breaks in adjacent ridges forming a line.

42. A machine-implemented method comprising:
identifying distinguishing characteristics associated with a biometric print, the distinguishing characteristics include at least a first distinguishing characteristic, which is at least a count of how many ridges are located between a second distinguishing characteristic and a third distinguishing characteristic;
at least temporarily storing the distinguishing characteristics as a representation of the biometric print; and
determining whether to grant access based on a comparison of a first set of distinguishing characteristics to a second set of distinguishing characteristics, one of the first set of distinguishing characteristics and the second set of distinguishing characteristics including the distinguishing characteristics that was at least temporarily stored.

43. A machine implemented method comprising:
acquiring multiple biometric prints from a user during a registration process;
identifying distinguishing characteristics associated with each of the biometric prints;
comparing each of the multiple biometric prints to one another;
discarding one or more of the plurality of the biometric prints based on the comparing; and
storing the distinguishing characteristics of the biometric prints that were not discarded as a representation of the biometric print, the distinguishing characteristics being stored in association with a user identification; and
determining whether to grant access based on a comparison of a first set of distinguishing characteristics to a second set of distinguishing characteristics, one of the first set of distinguishing characteristics and the second set of distinguishing characteristics including the distinguishing characteristics of the biometric prints that were not discarded and that were stored.

44. A machine-implemented method comprising:
acquiring a biometric print from a user;
determining whether to request another biometric print from the user;
if as a result of the determining, it is determined to request another biometric print, presenting a request for another biometric print to the user;
identifying distinguishing characteristics associated with the biometric print;
at least temporarily storing the distinguishing characteristics as a representation of the biometric print;
determining whether to grant access based on a comparison of a first set of distinguishing characteristics to a second set of distinguishing characteristics, one of the first set of distinguishing characteristics and the second set of distinguishing characteristics including the distinguishing characteristics of the biometric prints that were that were stored at least temporarily;
wherein
the biometric print is a first fingerprint;
the identifying includes at least
searching for bifurcations of ridges, and
searching for terminations of ridges; and
the method further comprising:
(a) collecting a plurality of fingerprints, which includes at least collecting the first fingerprint prior to the identifying;
(b) performing the identifying and the storing for each of the plurality of fingerprints;
(c) for each of the plurality of fingerprints, discarding distinguishing characteristics not found in at least one other of the plurality of fingerprints;
(d) for each of the plurality of fingerprints, determining whether the distinguishing characteristics are fewer in number than a threshold number;

(e) discarding those of the plurality of fingerprints having fewer distinguishing characteristics than the threshold number;

(f) computing matching scores for each of a plurality of pairs of fingerprints, wherein
each fingerprint of each of the plurality of pairs is one of the plurality of fingerprints,
each fingerprint of the each of the plurality of pairs is a member of more than one pair, and
each matching score is a value based upon a degree to which distinguishing characteristics of one fingerprint of the pair matched distinguishing characteristics of another fingerprint of the pair;

(g) computing at least one transformation including at least computing a rotation and computing a translation, wherein
the transformation computed is at least in part based on whether an improvement in matching indicated by the matching score results from the transformation,
a value of the translation in any direction could be positive, negative, or zero,
a value of the rotation could be positive, negative, or zero, and
the value of each matching score that is retained is a value resulting after the transformation is finished being computed;

(h) for each of the plurality of fingerprints not discarded computing a ranking based on each matching score associated with that fingerprint; and (i) discarding one or more of the plurality of fingerprints having rankings indicating poorer matches with others of the plurality of fingerprints than those of the plurality of fingerprints not discarded.

45. The method of claim 44, wherein remaining fingerprints from the plurality of fingerprints will be referred to as registration fingerprints, the method further comprising:
storing the registration fingerprints in long-term memory;
as part of a request for access to a secure entity, acquiring a second plurality of fingerprints;
repeating the identifying;
repeating (a)-(i), wherein remaining fingerprints from the second plurality of fingerprints will be referred to as newly acquired fingerprints;
computing at least one matching score, which will be referred to as at least one access matching score, wherein the at least one access matching score is computed for a pair of fingerprints in which one fingerprint of the pair is one of the registration fingerprints and another fingerprint of the pair is one of the newly acquired fingerprints; and
determining whether to grant access to the secure entity based on whether the at least one access matching score at least meets a threshold value.

46. The method of claim 45, wherein the at least one access matching score includes a plurality of access matching scores and the method further comprises:
computing a ranking based on the plurality of access matching scores; and
determining whether to grant access based on whether the ranking was greater than a threshold.

47. A machine-implemented method comprising:
acquiring a biometric print from a user;
determining whether to request another biometric print from the user;
if as a result of the determining, it is determined to request another biometric print, presenting a request for another biometric print to the user;
identifying distinguishing characteristics associated with the biometric print; and
at least temporarily storing the distinguishing characteristics as a representation of the biometric print;
determining whether to grant access based on a comparison of a first set of distinguishing characteristics to a second set of distinguishing characteristics, one of the first set of distinguishing characteristics and the second set of distinguishing characteristics including the distinguishing characteristics of the biometric prints that were that were stored at least temporarily;
the determining whether to request another biometric print includes at least determining whether a particular number of biometric prints were acquired, if less biometric prints were acquired than the particular number, the presenting of the request is performed;
prior to the determining of whether the particular number of biometric prints were acquired, determining whether the biometric print acquired via the acquiring is equal to or above a particular quality and if the biometric print is below the particular quality, discarding the biometric print and further, the determining does not include the biometric print in the number of biometric prints acquired;
the particular number being three or greater, the method further comprising:
after the particular number of biometric prints has been acquired,
comparing each biometric print acquired to other biometric prints acquired by comparing the distinguishing characteristics of the biometric print to other biometric prints,
if it is determined by the comparing of the distinguishing characteristics that a distinguishing characteristic appears in a first biometric print, but does not appear in at least one other biometric print, removing the distinguishing characteristic from the biometric prints and
determining a matching score for each pair of biometric prints compared,
determining a ranking for each biometric print based on the matching scores, for any given ranking of a given biometric print, the given ranking being a associated with a combination of at least a plurality of matching scores computed from a plurality of pairs of biometric prints, any given pair of biometric prints of the plurality of pairs includes the given biometric print and one biometric print that is not included in any other of the pairs of biometric prints from which the plurality of matching scores are computed that form the combination that the given ranking is associated with;
determining which biometric print has a ranking that is lower than the other biometric prints,
removing the biometric print that has the ranking that is lower than the other biometric prints.

48. A method comprising:
acquiring a plurality of registration biometric prints that match one another by having matching features, the acquiring including at least performing a separate acquisition for each of the plurality of registration biometric prints, each separate acquisition of each plurality registration biometric prints including a separate sensing of a biometric feature by a sensor to form a separate registration biometric print;
acquiring a plurality of access biometric prints that match one another having matching features, the acquiring including at least performing a separate acquisition for each of the plurality of access biometric prints, each separate acquisition of each plurality access biometric print including a separate sensing of a biometric feature by a sensor to form a separate access biometric print; and comparing the plurality of registration biometric prints that match one another to the plurality of access biometric prints that match one another to determine whether to grant access to a secured entity.

49. A machine-implemented method comprising:

collecting a plurality of biometric prints,
- each of the plurality of biometric prints being collected from the same body;
- each of the plurality of biometric prints being collected within the same session;
- a portion of the body exists whose scan is included in each of the plurality of biometric prints collected for each of the plurality of biometric prints applying a process for extracting distinguishing characteristics;

for a current unique aspect of a current biometric print, which is one of the distinguishing characteristics of the plurality of biometric prints, computing matching scores indicating a degree of match between the current distinguishing characteristic of the current biometric print and at least one distinguishing characteristic for each of the plurality of biometric prints other than the current biometric print;

repeating the computing of the matching scores for each of the distinguishing characteristics of the current biometric print;

determining which of the distinguishing characteristics to store as a representation of the current biometric print based on the matching scores of the distinguishing characteristics; and storing the distinguishing characteristics that were determined to be the distinguishing characteristics to store as a representation of the current biometric print; and determining whether to grant access based on a comparison of a first set of distinguishing characteristics to a second set of distinguishing characteristics, one of the first set of distinguishing characteristics and the second set of distinguishing characteristics including the distinguishing characteristics of the biometric prints that were that were stored.

50. The method of claim 49, further comprising:

computing a plurality of overall matching scores for the current biometric print, each overall matching score of the current biometric print being computed from a combination of the matching scores of the distinguishing characteristics of the current biometric print with the corresponding distinguishing characteristics of one other biometric print, each matching score for the current biometric print representing a match between the current biometric print and a different one of the other biometric prints that is represented by the other overall matching scores.

51. The method of claim 50, further comprising a ranking for the current biometric print from a combination of the plurality of overall matching scores of the current biometric print.

* * * * *